United States Patent [19]

Maeno

[11] Patent Number: 5,084,724
[45] Date of Patent: Jan. 28, 1992

[54] CAMERA

[75] Inventor: Hiroshi Maeno, Tokyo, Japan

[73] Assignee: Canon Kabushiki Kaisha, Tokyo, Japan

[21] Appl. No.: 684,493

[22] Filed: Apr. 15, 1991

Related U.S. Application Data

[63] Continuation of Ser. No. 590,554, Oct. 1, 1990, abandoned, which is a continuation of Ser. No. 426,423, Oct. 25, 1989, abandoned.

[30] Foreign Application Priority Data

Oct. 27, 1988 [JP] Japan ................. 63-271398

[51] Int. Cl.$^5$ .............................................. G03B 41/14
[52] U.S. Cl. ....................................... 354/430; 354/70
[58] Field of Search ................... 354/430, 70

[56] References Cited

U.S. PATENT DOCUMENTS

| | | | |
|---|---|---|---|
| 4,623,930 | 11/1986 | Oshima et al. | 354/430 X |
| 4,709,138 | 11/1987 | Suda et al. | 354/430 X |
| 4,780,739 | 10/1988 | Kawakami et al. | 354/430 |
| 4,965,619 | 10/1990 | Shikaumi et al. | 354/430 X |
| 4,970,540 | 11/1990 | Vasey et al. | 354/70 X |
| 5,012,347 | 4/1991 | Fournier | 354/70 X |

Primary Examiner—Russell E. Adams
Assistant Examiner—Jae N. Noh
Attorney, Agent, or Firm—Fitzpatrick, Cella, Harper & Scinto

[57] ABSTRACT

A camera comprising means capable of preventing image blurs; and instruction means capable of specifying a predetermined exposure mode if the means capable of preventing image blurs cannot completely compensate the image blurs.

61 Claims, 21 Drawing Sheets

| FIG. 5A | FIG. 5B |

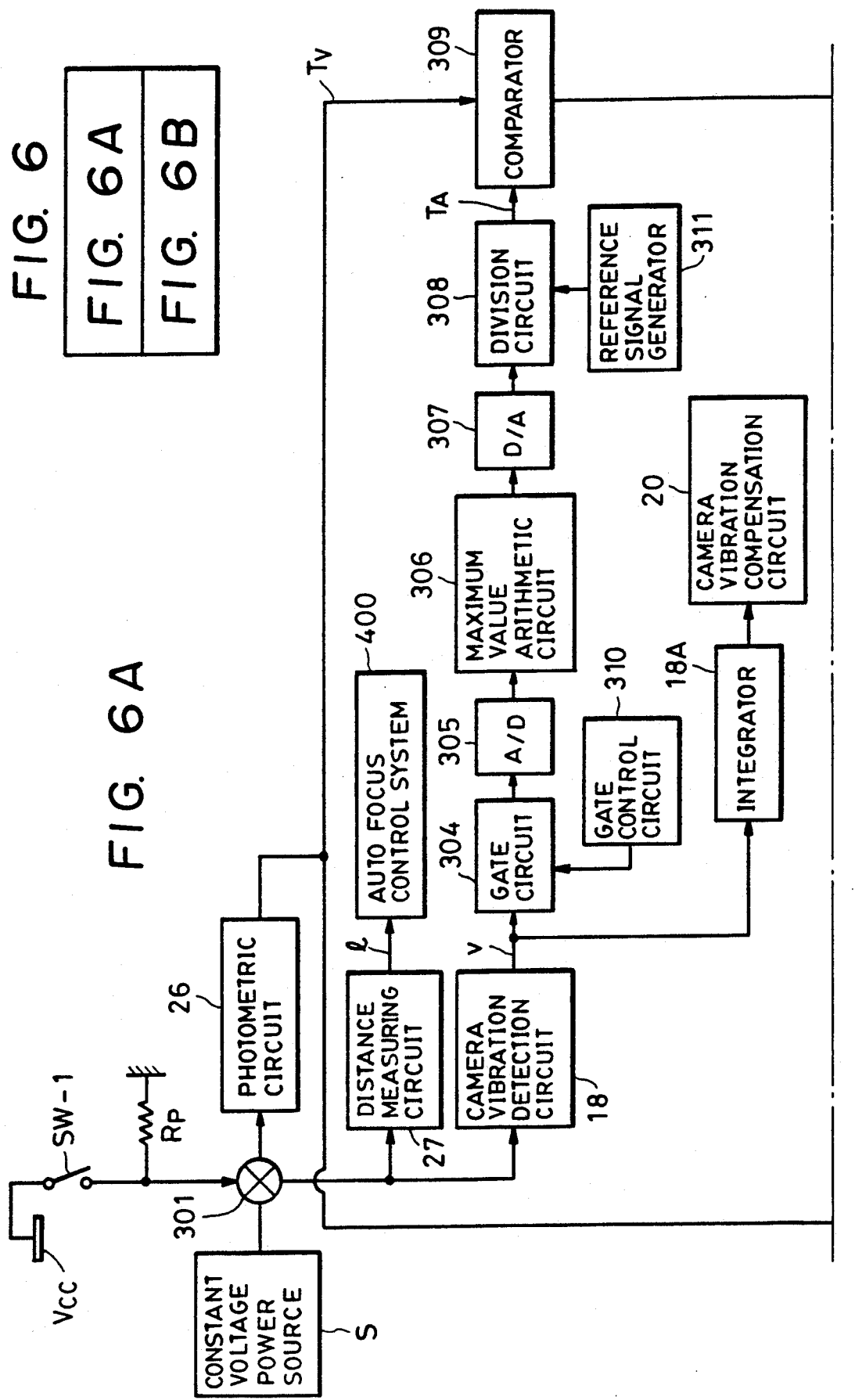

| FIG. 7A |
| FIG. 7B |

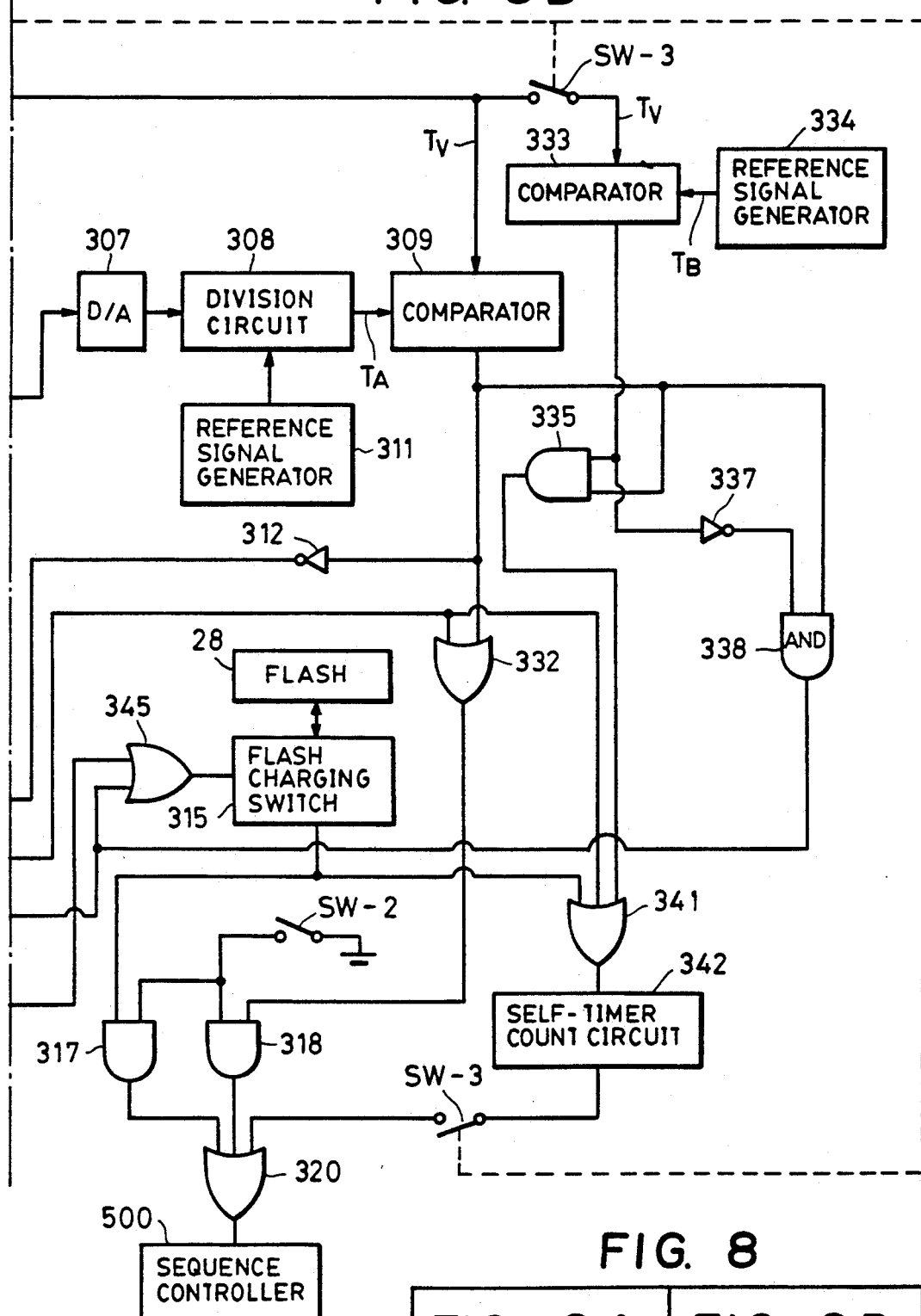

CAMERA

This application is a continuation of application Ser. No. 07/590,554, filed Oct. 1, 1990, which is a continuation of application Ser. No. 07/426,423, filed Oct. 25, 1989, both now abandoned.

BACKGROUND OF THE INVENTION

1. Field of the Invention

The present invention relates to a camera, and, more particularly, to a camera including a device to prevent image blurs on the image surface even if the camera is shaken at an act of photography.

2. Description of the Related Art

Recently, a large number of extremely automated cameras have been manufactured. With the extremely automated camera, a person who is not skilled in photography can readily take a well-focused and correctly exposed photograph if the camera is correctly directed toward a subject and the shutter release button is properly pressed. Furthermore, photographs which have conventionally needed high skill techniques can be readily taken.

However, in the above-described extremely automated camera, an image blur caused by the camera shake or the like cannot be prevented. Therefore, a study to develop "a camera equipped with a device to prevent image blurs (vibration isolating device)" has been conducted recently for the purpose of preventing any "image blur" on the image surface even if the camera is shaken during the act of photography. As a result, a variety of suggestions have been made. However, a practical "camera equipped with a device to prevent image blurs" which can be manufactured at a relatively low cost has not been as yet disclosed. In particular, any practical "device to prevent image blurs" suitably used in a non-interchangeable lens equipped built-in-flash camera has not been as yet disclosed. Furthermore, a practical exposure determining method to be employed in the "camera equipped with a device to prevent image blurs" has not been as yet disclosed.

The exposure conditions to be provided for the "camera equipped with a device to prevent image blurs" are inevitably complicated relative to those for a conventional camera with no "device to prevent image blurs". The reason for this lies in the fact that "a region in which the camera shake can be compensated for the purpose of preventing image blurs" must be employed as a variable for determining the exposure conditions in addition to the result of the photometry and the range finding.

SUMMARY OF THE INVENTION

Accordingly, an object of the invention is to provide a camera comprising means capable of preventing image blurs; and instruction means capable of specifying a predetermined exposure mode if the means capable of preventing image blurs cannot completely compensate the image blurs. As a result, even if an image blur which cannot be completely compensated by the device to prevent image blurs is generated, an exposure mode which is suitable for the state is selected so as to take a picture from which the influence of the image blur is eliminated. Furthermore, the probability of the generation of the image blurs at an action of photography by beginners can be lowered and the camera can be handled easily.

Further objects of the invention will be apparent from the following description of several embodiments thereof.

DESCRIPTION OF THE PREFERRED EMBODIMENTS

Embodiments of the present invention will now be described with reference to the drawings. The principle of generation of "an image blur" and an effective method to prevent image blurs will be described with reference to FIGS. 17 to 23 prior to making the description about the embodiments of the present invention.

Figure 17:
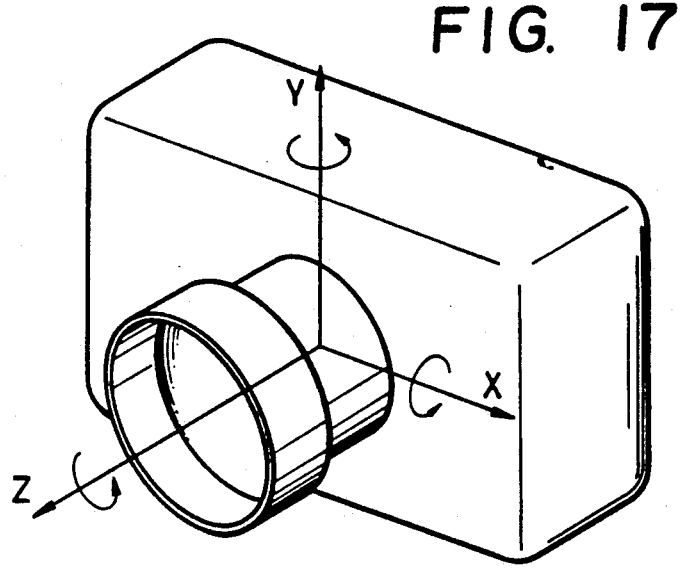
FIGS. 17 to 23 are views which illustrate the relationship between the camera shake and the image blur on the image surface.

Referring to FIG. 17, let the optical axis of the photographic optical system of the camera be the Z-axis, let the horizontal axis be the X-axis, and let the vertical direction be the Y-axis. A camera according to the present invention reveals 6 degrees of freedom consisting of 3 degrees in the directions of the X, Y, and Z-axes and three degrees in the direction of the rotation around the above-described axes. In order to simplify the description, a full-frame 35 mm camera (picture size: 24×36 mm) with an 85 mm telephoto lens (view angle: 28°30' diagonally, F-number: F4.0) is employed. In the description referring to this camera, an action of photography ranged over 1.7 m (20 times the focal length) is defined to be "usual photography" the typical range of which is 4.25 m, while an action of photography ranged between 0.85 to 1.7 m (10 to 20 times the focal length) is defined to be "closest focusing distance photography" the typical range of which is 1.3 m. Furthermore, an action of photography ranged to be less than 0.85 m is defined to be "closeup photography" the typical range of which is 0.43 m.

Then, the cases in which the image blur is generated in the above-described camera with the lens will be described.

1. Movement in the direction of X-axis (side shake)

Figure 18:
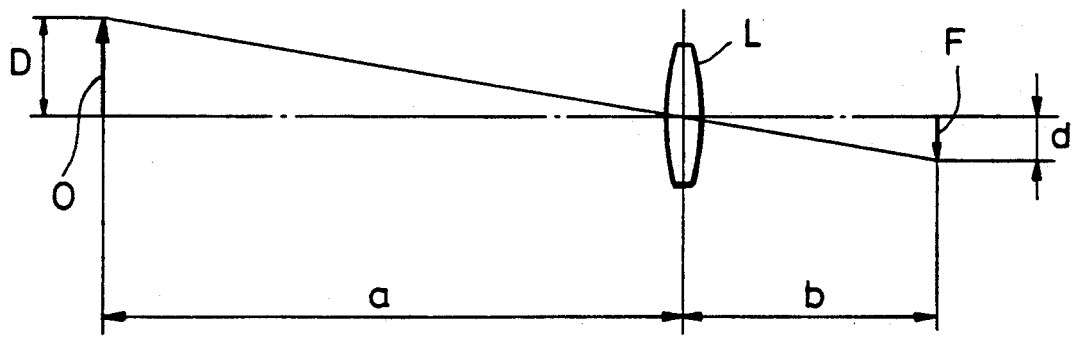

Assuming, as shown in FIG. 18, that the distance from lens L to subject O is a and the distance from lens L to film F is b, the side movement of the camera by distance D caused from the camera shake or the like can be viewed as the side movement of subject O by distance D when the camera is considered a stationary system. Therefore, assuming that the degree of blurs, that is the movement of an image on the image surface is d, the focal length of the lens is f, and the magnification is m, the following equations hold:

$$\frac{1}{a} + \frac{1}{b} = \frac{1}{f} \tag{1.1}$$

$$m = \frac{b}{a} = \frac{d}{D} \tag{1.2}$$

From these two equations, the distance of the movement d can be shown that:

$$d = mD = \frac{f}{a-f} D \tag{1.3}$$

Then, the intensity of the side shake will be described in each of the cases of the "usual photography", "closest focusing distance photography", and "closeup photography".

(i) In the case of the "usual photography" (a=4.25 m)
The movement d can be expressed by:

$$d = \frac{85}{4250 - 85} D = 0.02D.$$

Therefore, camera shake of 1 mm causes deviation of the image by 0.02 mm on the image surface.

In the case of the 35 mm format film, the deviation of the image is smaller than a permissible circle of confusion assuming that the diameter of this permissible circle of confusion is 0.035 mm. Therefore, any image blur cannot be recognized on the taken photograph. As a result, the image blur is prevented even if the camera is shaken.

(ii) In the case of the "closest focusing distance photography" (a=1.3 m)
The movement d can be expressed by:

$$d = \frac{85}{1330 - 85} D = 0.07D.$$

Therefore, the camera shake of 1 mm causes the image to be moved on the image surface by 0.07 mm which is two times the 0.035 mm-confusion permissible circle. As a result, an image deviation of 0.25 mm is generated in the case where an enlarging magnification of about 3.5 times the service print is arranged. Although any excessive image blur is not recognized on the service size print, it can be easily recognized if the enlarging magnification is increased. Therefore, the closest focusing distance photography is affected adversely by the side shake.

(iii) In the case of the "closeup photography" (a=0.43 m)
The movement d becomes:

$$d = \frac{85}{430 - 85} D = 0.246D.$$

Therefore, the camera shake of 1 mm causes the image on the film to be moved by 0.246 mm. As a result, an image deviation of about 0.9 mm is generated on the surface of the service size print. Consequently, the closeup photography is affected adversely by the side camera shake since excessive image blurs are generated on the film.

Movement in the direction of Y-axis (vertical shake)

The influence of the vertical shake can be considered to be the same as that of the side shake. Therefore, the image blurs are generated on a print of the enlargement magnification exceeding the service size in the case of the closest focusing distance photography. Furthermore, in the case of the closeup photography, excessive image blurs are generated.

Movement in the direction of Z-axis (longitudinal shake)

Figure 19:
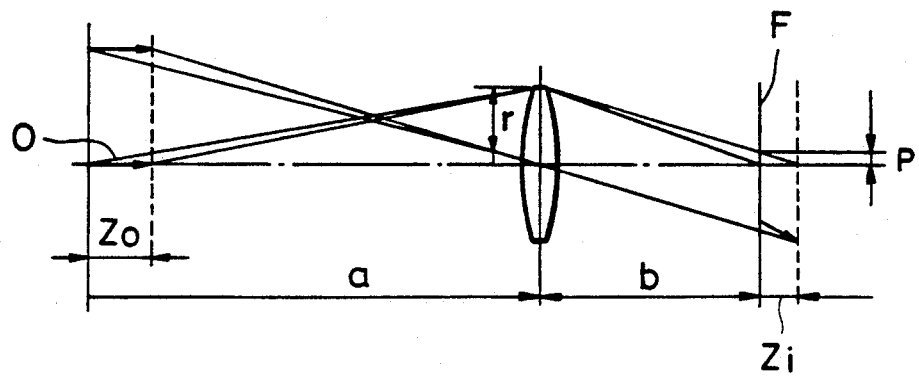

It will be described with reference to FIG. 19. Assuming, similarly to the above description, that the distance from lens L to subject O is a, the distance from lens L to the surface of the film is b, the focal length is f, the effective radius of lens L is r, the relative movement of subject O in the direction of the optical axis is $Z_0$ (although it is the movement of the lens L in the direction of the optical axis, it can be expressed by the movement of subject O since the camera is arranged as a stationary coordinate system), the movement of the image in the direction perpendicular to the optical axis of film F with respect to the relative movement $Z_0$ of subject O in the direction of the optical axis is $\rho$, and the movement of the image in the direction of the optical axis is $Z_i$, the following equations hold:

$$\frac{1}{a} + \frac{1}{b} = \frac{1}{f} \tag{3.1}$$

$$\frac{1}{a - Z_0} + \frac{1}{b + Z_i} = \frac{1}{f} \tag{3.2}$$

$$\frac{\rho}{Z_i} = \frac{r}{b + Z_i} \tag{3.3}$$

Modifying Equation (3.2):

$$Z_i = \frac{f(a - Z_0)}{a - Z_0 - f} - b \qquad (3.4)$$

Modifying Equation (3.1):

$$b = \frac{af}{a - f} \qquad (3.5)$$

Substituting Equation (3.5) into Equation (3.4):

$$Z_i = \frac{f(a - Z_0)}{a - Z_0 - f} - \frac{af}{a - f} \qquad (3.6)$$

On the other hand, modifying Equation (3.3):

$$\rho = \frac{rZ_i}{b + Z_i} \qquad (3.7)$$

That is, Equation (3.6) denotes the movement of the image in the direction of the optical axis, while Equation (3.7) denotes the movement of the same in the direction perpendicular to the optical axis.

(i) In the case of usual photography (a=4.25 m)
Assuming that $Z_0 = 1$ mm and substituting a=4250, $$r = \frac{85}{4} \times \frac{1}{2} = 10.625$$

(that is, F number is F4), and f=85 into Equations (3.5) to (3.7), $Z_i = 4.17 \times 10^{-4}$, b=86.732693, and $\rho = 5 \times 10^{-5}$ are given. Therefore, since both $Z_i$ and $\rho$ are sufficiently small, they can be neglected. That is, any image blur cannot be recognized.

(ii) In the case of the closest focusing distance photography (a=1.3 m)
Substitution of a=1300, f=85, r=10.625, and $Z_0 = 1$ into Equations (3.5) to (3.7) gives $Z_i = 4.898 \times 10^{-3}$, b=90.9465, and $\rho = 5.721 \times 10^{-5}$. Therefore, also in this case, since both $Z_i$ and $\rho$ are sufficiently small, any image blur cannot be recognized.

(iii) In the case of the closeup photography (a=0.43 m)
Substitution of a=430, f=85, r=10.625, and $Z_0 = 1$ into Equations (3.5) to (3.7) gives $Z_i = 0.0609$, b=105,942, and $\rho = 0.006$. Therefore, although a slight blur of image is generated in this case, the influence of the image blur on the quality of the photograph can be reduced since $\rho$ is sufficiently small.

4. The rotation around X-axis (angular deflection around the lateral axis)

It will be described with reference to FIG. 20. When the camera deflects by an angle $\theta$ relative to the (X-axis, the subject moves by $a\theta$ vertically with respect to lens L. As a result, the image on the film moves relatively by $d = b\theta$ in the vertical direction.

Figure 20:
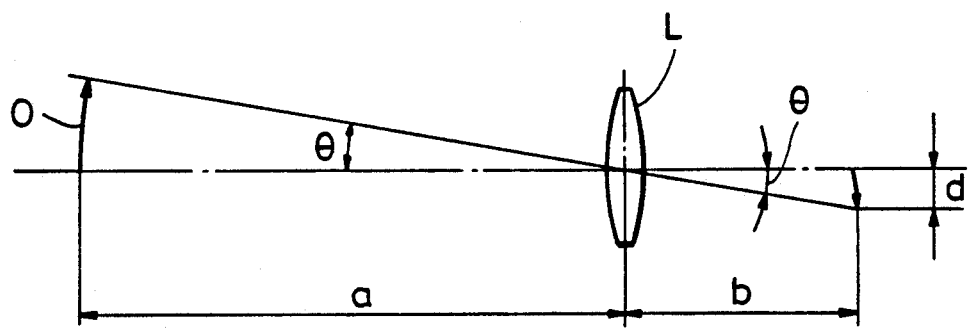

Therefore, the following equations hold in FIG. 20:

$$\frac{1}{a} + \frac{1}{b} = \frac{1}{f} \qquad (4.1)$$

$$d = b\theta \qquad (4.2)$$

From these two equations, the following equation holds:

$$d = \frac{af}{a - f} \theta \qquad (4.3)$$

Assuming that the width of the camera is 140 mm, the deflection angle $\theta$ can be expressed as follows when the end of the came moves by 1 mm:

$$\theta = \frac{\text{deviation}}{\text{length from center of lens to end of camera}} \quad \text{Therefore,} \quad \theta = \frac{1}{70}$$

(i) In the case of the usual photography (a=4.25 m)
Substituting a=4250, f=85, and $\theta = 1/70$ into Equation (4.3) gives d=1.24 mm. That is, the image deviation on the image surface becomes 1.24 mm, causing the image blurs to be visually recognized. Therefore, a considerable adverse affect is involved.

(ii) In the case of the closest focusing distance photography (a=1.3 m)
Substitution of a=1300, f=85, and $\theta = 1/70$ into Equation (4.3) gives d=1.30 mm. Therefore, image blurs which can be visually recognized are generated, and the thus-recognized blurs become worse than those observed on the print taken by the usual photography.

(iii) In the case of the closeup photography (a=0.43 m)
Substitution of a=430, f=85, and $\theta = 1/70$ into Equation (4.3) gives d=1.513 mm. Therefore, the image blurs become excessive with respect to the blurs experienced with the closest focusing distance photography.

When a>>F, the relationship $d \approx f\theta$ holds. Therefore, the image blurs become excessive in proportion to the focal length (that is, in proportion to the distance arranged in the telephoto photography) since the image blurs are generated in proportion to focal length f. Therefore, the possibility of taking a photograph with a blurred image is increased in the camera with a telephoto lens than that in a camera with a wide angle lens. In addition, the intensity of the blur becomes excessive. Furthermore, it is apparent that the angular deflection of the camera shake affects adversely on the image blur in the case of the camera with a telephoto lens.

5. Rotation around the Y-axis (angular deflection around the lateral axis)

The angular deflection around the Y-axis can be discussed in the same analysis method that is employed in the angular deflection around the X-axis. Therefore, the degree of the image blur in any of the usual photography, closest focusing distance photography, and closeup photography becomes the value calculated in the former paragraph 4.

6. Rotation around the Z-axis (angular deflection around the optical axis)

Figure 21:
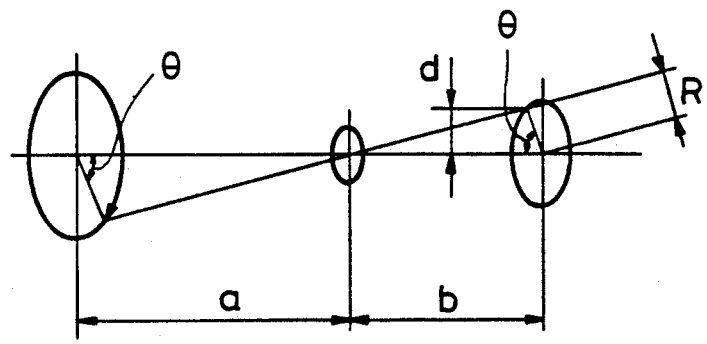

As shown in FIG. 21, when the camera is rotated by an angular degree of $\theta$ around the optical axis, the deviation of image as expressed by Equation (6.1) is generated on the image surface:

$$d = R\theta \qquad (6.1)$$

where R is the length of 21.6 of the diagonal line of a frame of the 35 mm format film. In addition, it is assumed that the value of $\theta$ is 1/70 as assumed in chapter 4.

Substitution of the values of R and $\theta$ into Equation (6.1) gives d=0.31. That is, an image deviation of 0.31 mm is generated in the periphery of the frame. Since the thus calculated value is sufficiently small with respect to that in the case of the angular deflection around the X-axis discussed in part 4 above and the deviation of the image at the central portion of the frame (R=0) is zero, it is apparent that the affect of the image deviation on the quality of the picture is sufficiently restricted. Furthermore, since the main subject of the photography is generally disposed at the center of the frame in the action of framing process, the slight image-blurs in the periphery of the frame cannot excessively deteriorate the quality of the picture. In addition, the affect of the image blurs can be substantially disregarded since the periphery of the frame can easily generate distortions due to various aberrations of the lens.

As described above, the rotation around the Z-axis (the optical axis) does not cause the excessive image blurs which excessively deteriorate the quality of the picture. However, the rotation around an axis which is in parallel with Z-axis includes the deviations in the directions of the X-axis and Y-axis and the rotation around the Z-axis. Therefore, this rotation causes the image blurs which can deteriorate the quality of the picture.

As described above, the slight deviation of the camera due to the camera shake or the like at the action of photography raises a problem of the image blurs in the following cases:

A. In the case of the usual photography (a=4.25 m)
An angular deflection around the X-axis and the same around the Y-axis B. In the case of the closest focusing distance photography (a=1.3 m)
If the angular deflection around X-axis, the same around the Y-axis, the deviation in the direction of the X-axis, and the same in the direction of the Y-axis are of a considerable degree, the image blurs due to these deviations arise a problem.

C. In the case of the closeup photography (a=0.43 m)
The deviations in the directions of the X-axis and the Y-axis causes a considerable image blurs as well as the image blurs generated due to the angular deflections around the X-axis and the same around the Y-axis. Furthermore, the image blurs generated due to the deviation in the direction of the Z-axis cannot be neglected. In addition, if a rotation around an axis which is parallel with the Z-axis is generated, the affect of the image blurs due to this rotation cannot be disregarded.

In order to prevent the above-described image blurs, it is necessary for the photographic optical system to be moved so as to countervail the movement of the camera caused from the camera shake.

As described above, at the action of the usual photography, the closest focusing distance photography, and the closeup photography, the movement of the camera which can cause the most critical image blurs is the rotation around the X-axis, the same around the Y-axis, the linear motion in the direction of the X-axis, and the same in the direction of the Y-axis. Therefore, the image blurs on the image surface due to these motions of the camera can be prevented by way of moving the photographic optical system of the camera to prevent the deviation of the image on the image surface. Specifically, if the rotation around the X-axis, the same around the Y-axis, the deviation in the direction of the X-axis, and the same in the direction of the Y-axis take place in the camera, image blurs can be prevented by swinging the image surface or the photographic optical system in the direction in which the image deviation on the surface is countervailed. As a specific example of the method of preventing the image deviation, a star-field camera apparatus employed in astronomical observatories can be exemplified. In the star-field camera apparatus, the image blurs are prevented by rotating the camera at rotary angular-velocity $\omega$ in the reverse direction to the direction of the camera shake. Although such a device to prevent the image blurs is suitably employed in a large-size photography device, it is not suitable for a small-size photography machine apparatus such as a hand held camera.

According to the present invention, the photographic optical system is swung at the speed of the deviation of the image so that the image blurs are prevented.

Figure 22:
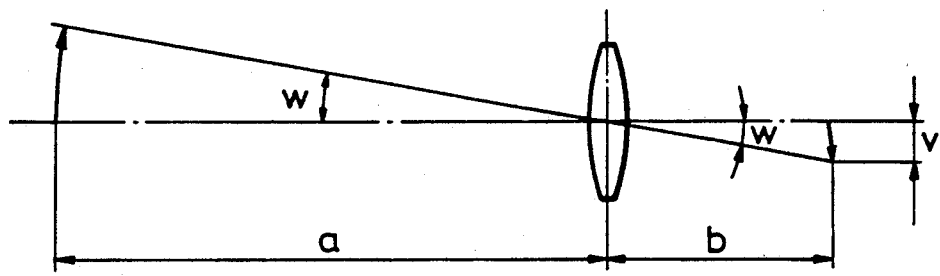
Figure 23:
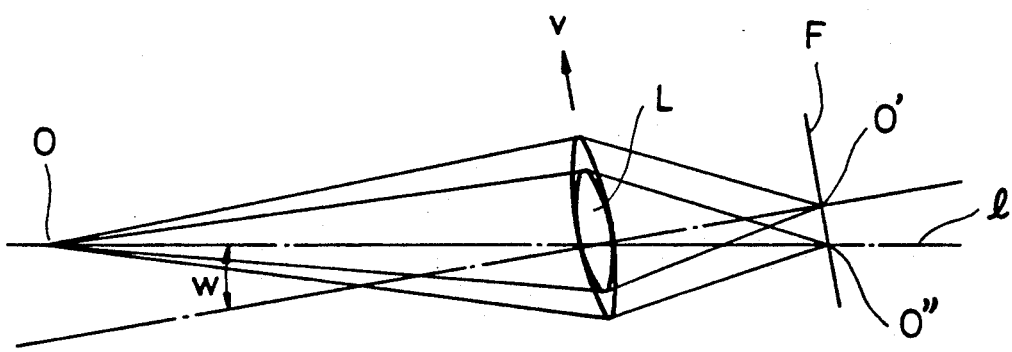

FIGS. 22 and 23 are views which illustrate the principle of a method of preventing the image blurs, the method being applied to the camera according to the present invention. FIG. 22 is a view which illustrates the movement of the image on the image surface when the camera is swung relative to the Y-axis or the X-axis, while FIG. 23 is a view which illustrates the principle of the method of preventing the image blurs.

When the photography lens L of the camera is swung at angular velocity $\omega$ due to the camera shake or the like, the image on the image surface and the subject move together in the direction perpendicular to the photography optical axis at angular velocity $\omega$ assuming that the lens L is a stationary system. Referring to FIG. 22, the speed v of the deviation of the image on the image surface is expressed by $v=b\omega$. Furthermore, since $$b = \frac{af}{a-f}$$

from the relationship expressed by $$\frac{1}{a} + \frac{1}{b} = \frac{1}{f},$$

the relationship expressed by $$v = \frac{af}{a-f} \omega$$

can be obtained. If $a>>f$, the relationship $v \approx f\omega$ can hold.

FIG. 23 is a view which illustrates the principle of the method of countervailing the deviation of the image. Referring to FIG. 23, it is assumed that point O is imaged at central point O' on optical axis l of film F by lens L when the camera is not shaken. If the camera is shaken causing lens L to be inclined, the image formed at central point O' of film F is moved to point O'' after a certain time lapse. Assuming that the angular velocity of the inclination of lens L caused from the camera shake is $\omega$ and the moving speed of the image on the surface of the film is v, an equation $v=b\omega$ holds. Therefore, image deviation on the surface of the film can be prevented by moving lens L at the speed v in the reverse direction to the direction of the movement of the image on the surface of the film.

According to the method to prevent image blurs, since the speed v at which lens L is moved is expressed by $$v = \frac{af}{a-f} \omega,$$

v can be changed in accordance with distance a from the subject. Therefore, the output of a range finding device must be utilized in order to correctly control v. Furthermore, the value of ω must be obtained from the output from an angular accelerometer mounted on the camera.

In the case where the method of preventing the image blurs is applied to an electronic still-camera or the like of the type arranged such that picture elements such as CCD are disposed on the image surface as an alternative to the silver salt film, the angular deflection and the lateral deviation can be simultaneously detected from the output signal from the picture elements without any necessity of distinguishing the angular deflection from the lateral deviation. Therefore, the necessity of inputting the output from the range finding device or the same from the angular accelometer can be eliminated.

On the basis of the result of discussion about the image blurs, the device to prevent the image blurs for the camera is arranged to be capable of preventing the image blurs due to the swinging around the X-axis and the Y-axis.

Then, the structure of the device to prevent the image blurs (the vibration isolating device) mounted on the camera according to the present invention will be described with reference to FIGS. 9 to 16.

Figure 9:
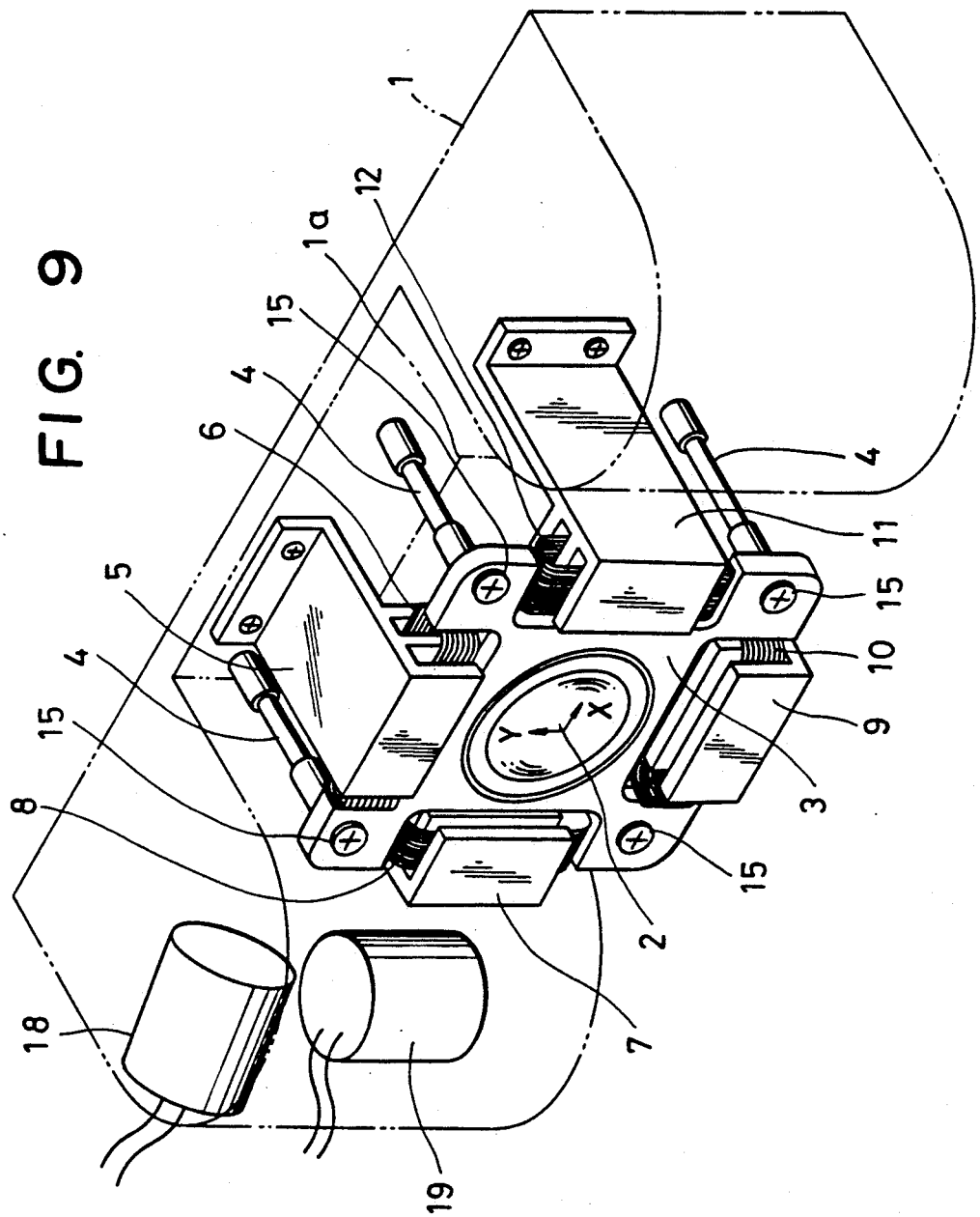
FIG. 9 is a perspective view which schematically illustrates an essential portion of a device to prevent image blurs mounted on the camera according to the present invention.

FIG. 9 is a perspective view which illustrates the structure of the vibration isolating device according to this embodiment, where reference numeral 1 represents a camera body, and 3 represents a lens support-frame for supporting a lens 2, the lens support-frame being capable of compensating the camera shake. The lens support-frame 3 is designed to have a rectangular shape having the sides whose central portions are cut out in part. A cylindrical screw 15 is inserted into each of the four edges of the lens support-frame 3 for the purpose of fixing each of the ends of support rods 4 to be described later.

Figure 10:
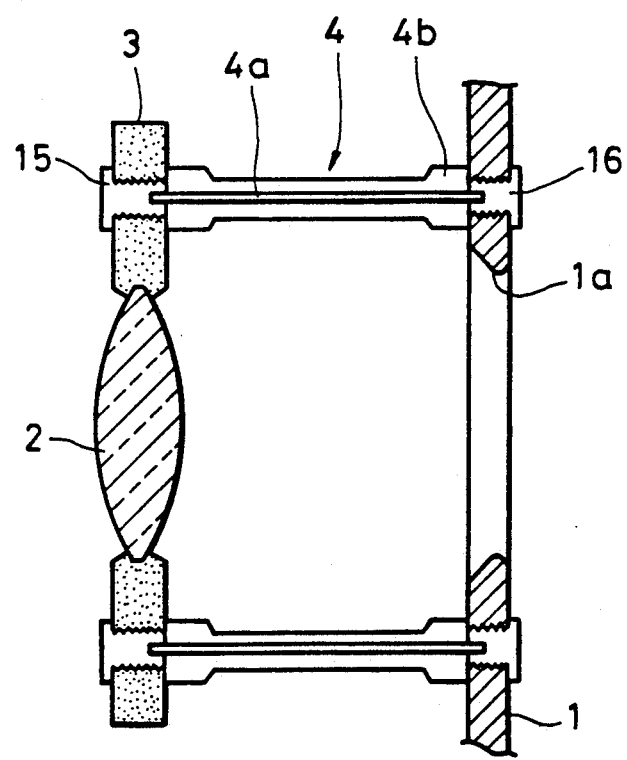
FIG. 10 is a vertical cross-sectional view which illustrates the support structure of a correction optical system including the lens support frame shown in FIG. 9.
Figure 11:
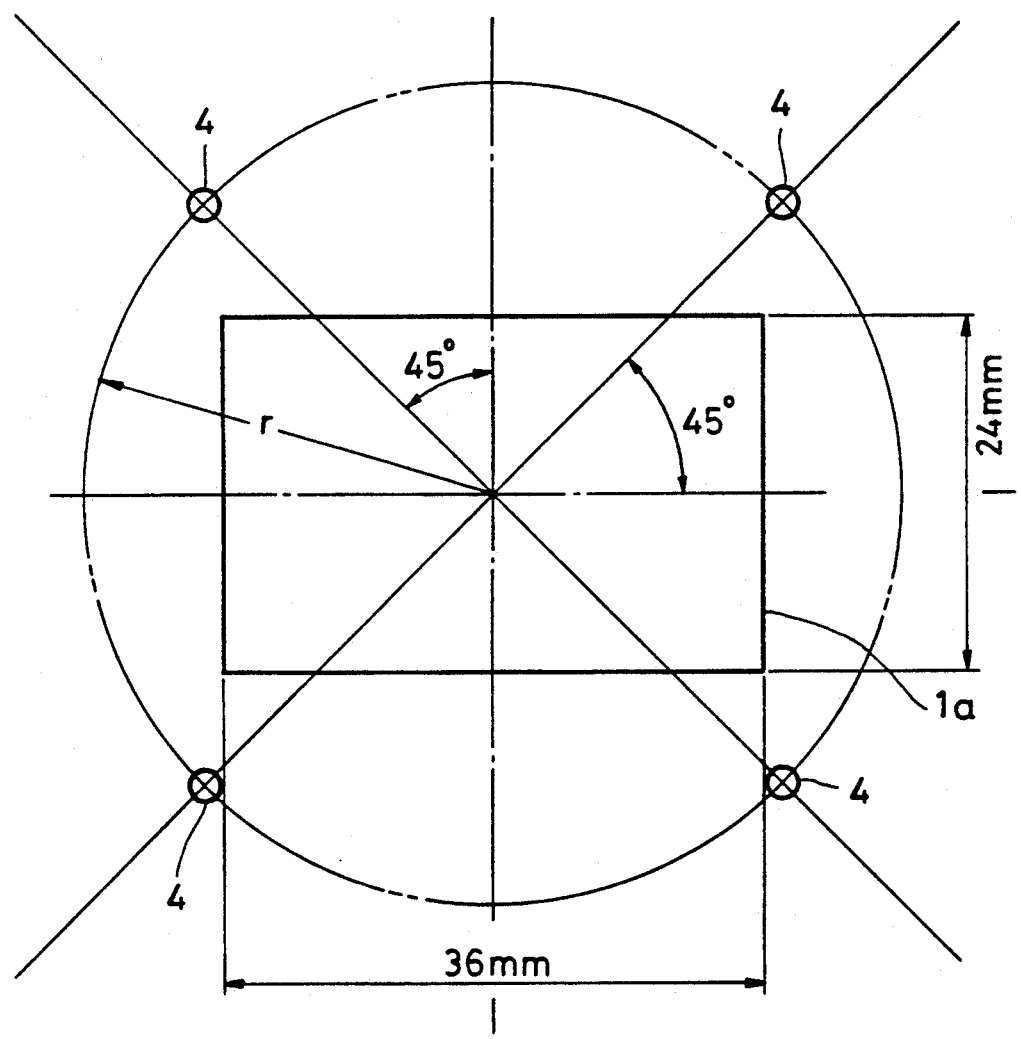
FIG. 11 is a view which illustrates the relative positional relationship between the support rods and the aperture in the structure shown in FIG. 9.
Figure 12:
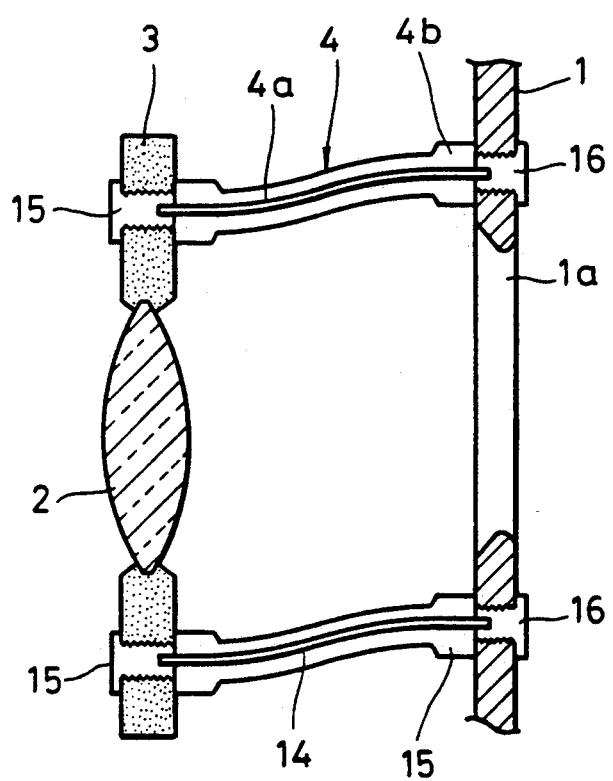
FIG. 12 is a view which illustrates a state of the structure shown in FIG. 10.
Figure 13:
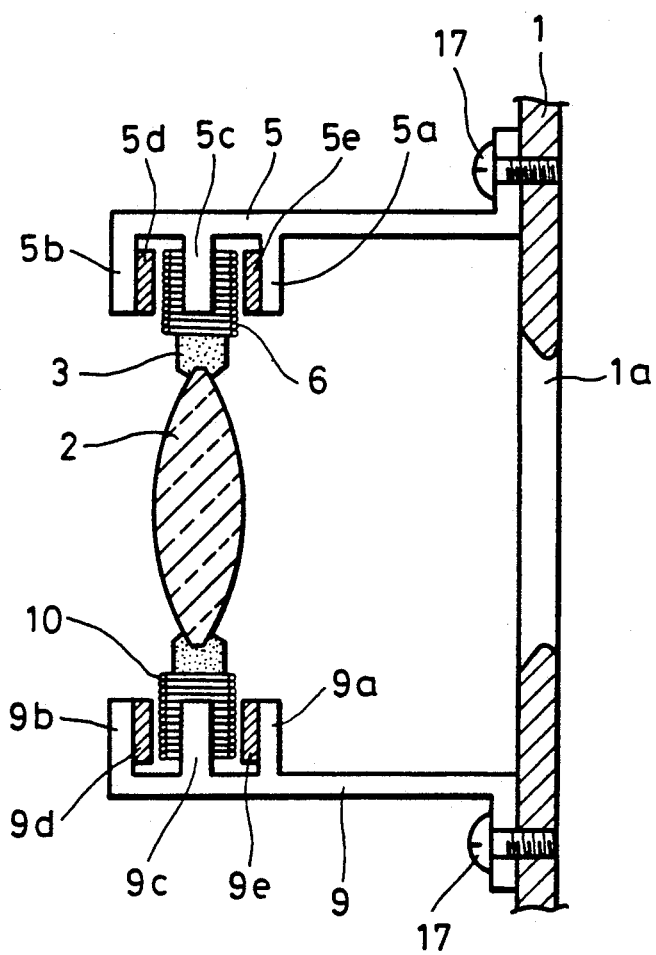
FIG. 13 is a vertical cross-sectional view which illustrates the members forming the actuator and the detection means shown in the device shown in FIG. 9.

Reference numeral 4 represents four flexible support rods whose each end is secured to the lens support frame 3 while the other end thereof is secured to the rear plate of the camera body 1 so as to support the lens support frame 3 in a cantilever manner. As shown in FIG. 10, which is a cross-sectional view, the support rod 4 is formed by covering a metal core 4a made of phosphor bronze with a soft and elastic material 4b such as rubber. The metal core 4a has two ends which project over the end surface of the soft and elastic material 4b and which are secured, by soldering or the like, by a screw 15 inserted into the lens support frame 3 and a screw 16 inserted into the camera body 1. The screws 15, 16 and the support rods 4 are, as shown in FIG. 11, disposed at central-angular intervals of 45° on the circumference of a circle having a diameter of 2 r which is larger than the length of the diagonal line of an aperture 1a formed in the camera body 1. The support rods 4 are disposed in parallel with the optical axis, and are arranged to have the same length from one another. Since the lens support frame 3 is, in a cantilever manner, supported at the front ends of the support rods which have the same length, it can be moved in the direction perpendicular to the optical axis. At this movement, the support rods 4 are able to elastically deflect. Coils 6, 8, 10, and 12 each of which is wound around a rectangular frame are fitted within the cut-out portions on the sides of the lens support frame 3, the coils 6, 8, 10, and 12 being as well secured to the lens support frame 3. Furthermore, four yokes 5, 7, 9, and 11 secured, in a cantilever manner, to the rear side of the camera body 1 by screw 17 are disposed to correspond to the above-described four coils 6, 8, 10, and 12. The thus incorporated coils 6, 8, 10, 12, yokes 5, 7, 9, and 11 form two electromagnetic actuators and two lens support frame movement-detection means. As shown in FIG. 13, three teeth or projections 5a to 5c and 9a to 9c which project in the direction perpendicular to the drawing sheet (in the direction perpendicular to the optical axis) are formed at each of the ends of the yokes 5, 7, 9, and 11 (although only the yokes 5 and 9 are shown in FIG. 13, the yokes 7 and 11 having the same structure are provided). The central projections 5c and 9c are retractably inserted into the coils 6 and 10 so as to serve as the cores for the coils 6 and 10. Permanent magnets 5d, 5c, 9d, and 9c are secured to the projections 5a, 5b, 9a, and 9b disposed so as to hold the projections 5c and 9c. The yoke 5, the permanent magnets 5d, and 5c secured to this yoke 5 form a stationary portion of an electromagnetic actuator which is capable of moving the lens support frame 3 in the direction of the Y-axis. On the other hand, the coil 6 serves as a movable portion of the electromagnetic actuator. Furthermore, the yoke 9, the permanent magnets 9d, 9c, and the coil 10 form a moving-speed detection means which is capable of detecting the moving speed of the lens support frame 3 in the direction of the Y-axis. In addition, the yoke 7 and the coil 8 form an electromagnetic actuator which is capable of moving the lens support frame 3 in the direction of the X-axis. The yoke 11 and the coil 12 form a moving speed detection means which is capable of detecting the moving speed of the lens support frame 3 in the direction of the X-axis.

Referring back to FIG. 9, reference numeral 18 represents a first camera-shake detection means capable of detecting the angular acceleration of the camera shake around the X-axis, and reference numeral 19 represents a second camera-shake detection means capable of detecting the angular acceleration of the camera shake around the Y-axis, these camera shake detections means being formed by known gyrostabilizers or angular acceleration sensors.

Figure 14:
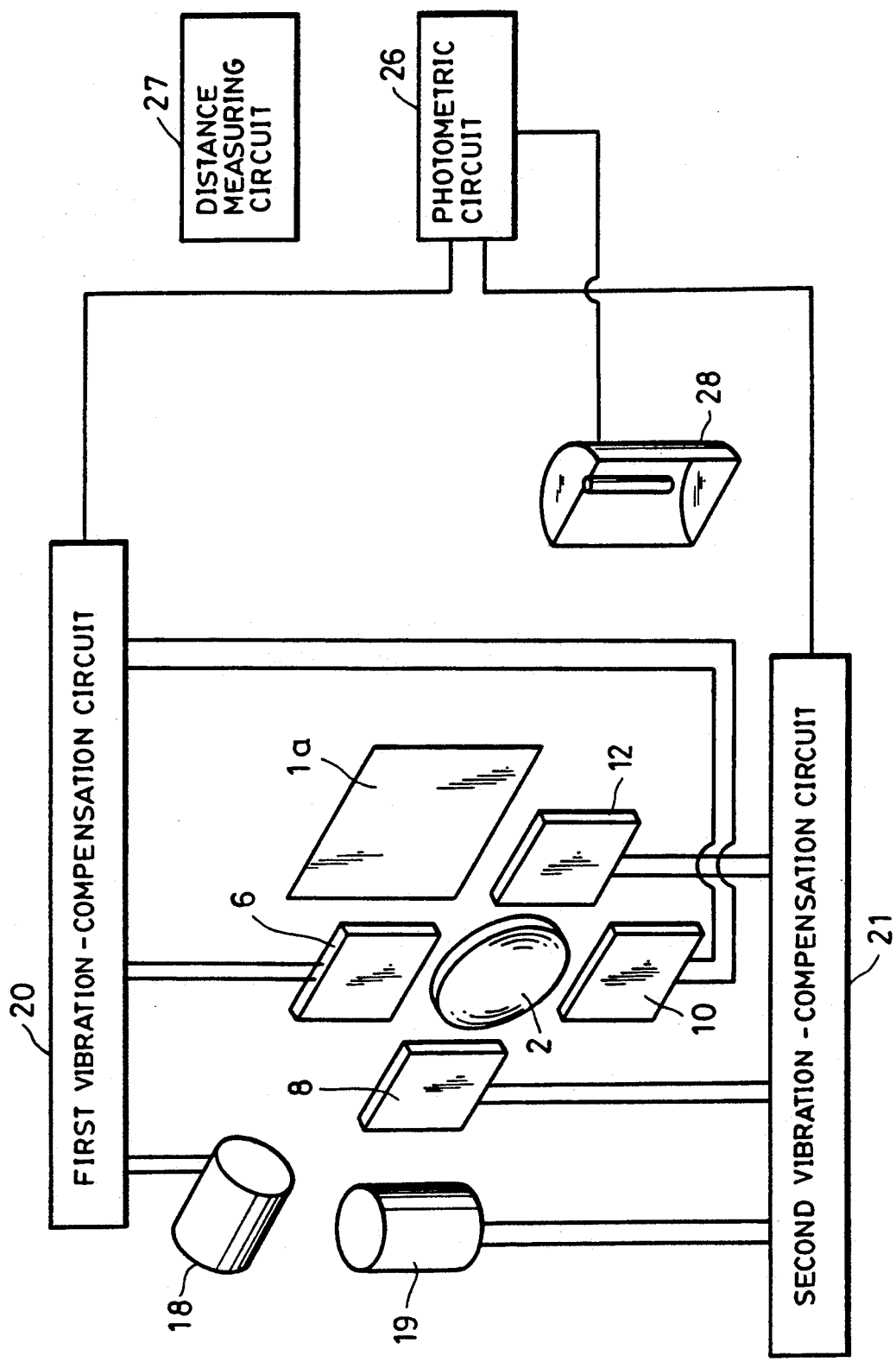
FIG. 14 is a view which illustrates the elements of the control system, the photometric portion, and the range finding portion of the device to prevent image blurs.

FIG. 14 is a schematic circuit diagram for use in the device to prevent the image blurs and electric devices related to the former device. Referring to this drawing, reference numerals 6, 8, 10, and 12 represent the above-described coils, while reference numerals 18 and 19 represent the camera shake detection means. Reference 20 represents a first deviation-compensation circuit capable of controlling the electric current to be supplied to the coil 6 on the basis of the result of calculations of the movement or speed to compensate the camera shake for the purpose of preventing the image blurs on the image surface (in the aperture 1a) when the camera is shaken around the X-axis, the movement or speed being to be given to the lens 2. Reference numeral 21 represents a second deviation-compensation circuit capable of controlling the electric current to be supplied to the coil 8 on the basis of the result of calculations of the movement or speed to compensate the camera shake for the purpose of preventing the image blurs on the image surface when the camera is shaken around the Y-axis, the movement or speed being to be given to the lens 2. Reference numeral 26 represents a known photometric circuit, 27 represents a known range finding circuit, and 28 represents a known flash device. The device to prevent the image blurs is formed by the camera shake detection means 18 and 19, the first and second deviation-compensation circuits 20 and 21, two electromagnetic actuators and two lens support-frame movement detections means comprising the above-described yokes and coils, and a compensation optical system formed by the lens 2, the lens support frame 3, and the support rods 4.

Then, the control operation conducted by the device to prevent the image blurs and structured as described above will be described. That is, when the camera is angularly deflected around the X-axis, the output voltage corresponding to the intensity and the direction of the camera shake is generated by the camera shake detection means 18, the output voltage being then supplied to the first deviation-compensation circuit 20. The first deviation-compensation circuit 20 receives the output from the camera shake detection means 18 so as to calculate an electric current to be supplied to the coil 6, the electric current corresponding to the image-deviation compensatory movement to be given to the lens support frame 3. The first deviation-compensation circuit 20 also conducts a control operation so as to cause the thus calculated electric current to be supplied to the coil 6. When the electric current is supplied to the coil 6, the coil 6 and the lens support frame 3 are moved in the direction of the Y-axis by an electric magnetic force generated between the coil 6 and the yoke 5 as shown in FIG. 9. As a result, the lens 2 is moved in the direction of the Y-axis along the surface of a circular arc whose center is arranged at the base portion of the support rod 4 (the end portion secured to the camera body 1) and to have a radius of the length of the support rod 4. Therefore, the image on the image surface is retained at a position which is the position in the case where the camera is not shaken. When the lens support frame 3 is moved in the direction of the Y-axis, a change in the relative positional relationship becomes apparent between the coil 10 and the yoke 9, causing an induction current to be generated in the coil 10. As a result, a voltage signal which corresponds to the induction current is supplied, as a feedback signal, to the deviation compensation circuit 20. Therefore, the deviation compensation circuit 20 calculates the image-deviation compensatory movement which corresponds to the deviation between the output from the coil 10 and the output from the camera shake detection means 18 so as to supply an electric current which corresponds to the result of the calculation to the coil 6. As a result, the position of the lens 2 is controlled.

When the camera is angularly deflected around the Y-axis, the control operation of the prevention of the image blurs is conducted similarly to the above-described operation by means of the camera shake detection means 19, the deviation compensation circuit 21, the coil 8 serving as an electromagnetic actuator, and a coils 12 serving as a means to detect the movement of the lens 2.

In the above-described structure, the other control factors and the control loop are varied in accordance with a fact that the camera shake detections means 18 and 19 comprise any of an acceleration sensor, speed sensor, or position sensor. However, such change does not cause the change in the essential concept of the above-described device to prevent image blurs. For example, in order to detect the movement of the lens support frame 3, the position of the lens support frame 3 may be directly detected as an alternative to the method arranged such that the moving speed of the lens support frame 3 is detected. Furthermore, in order to control the lens support frame 3, the position of the lens support frame 3 may be directly controlled as an alternative to a method arranged such that the moving speed is detected.

Figure 15:
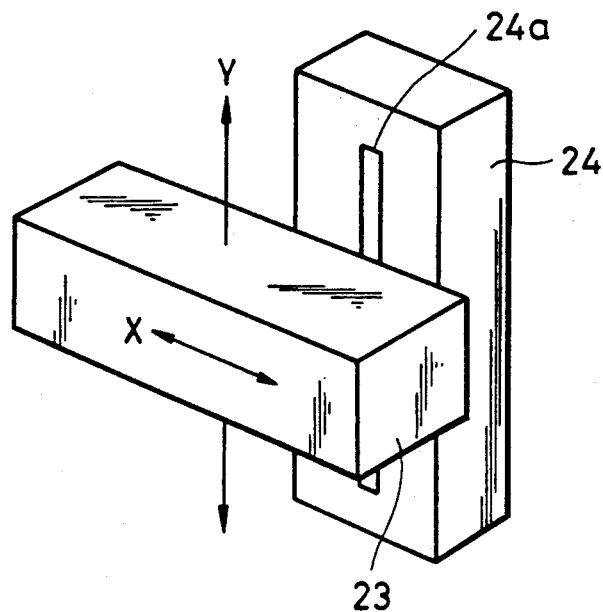
FIGS. 15 and 16 are views which illustrate a structure in which a semiconductor position-detection device is employed as the means for detecting the deviation of the lens support frame of the device shown in FIG. 9.

FIG. 15 is a view which illustrates an embodiment in which position sensors 22 and 23 each of which comprises a known PSD (Position Sensing Device) are employed to serve as means for detecting the movement of the lens support frame 3 as an alternative to the speed sensing type induction power generating means formed by combining the above-described coils, permanent magnets, and yokes.

Figure 16:
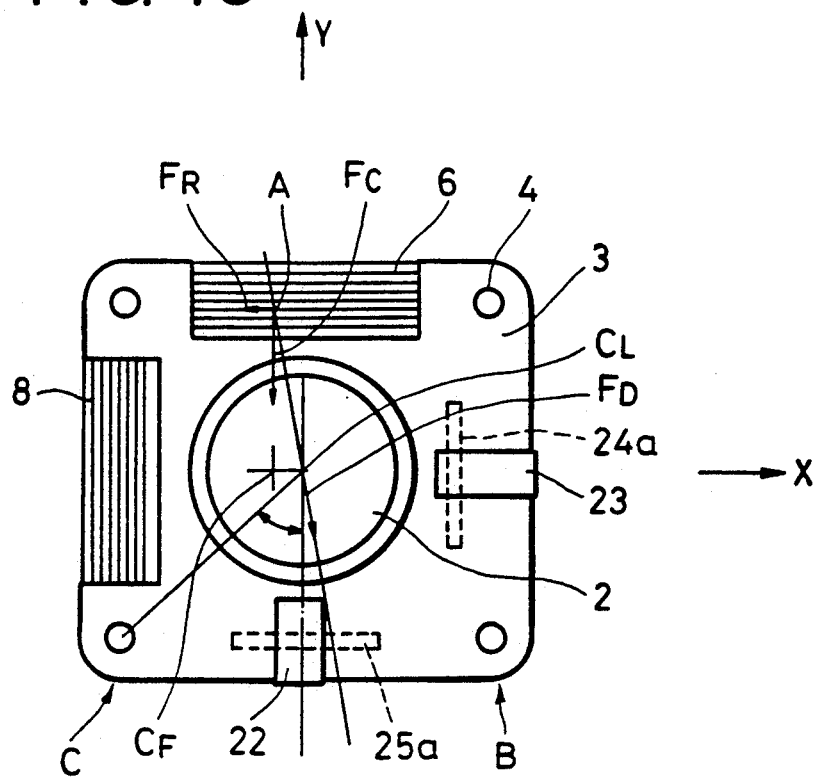

As seen in FIG. 16, position sensors 22 and 23 are secured to the lens support fame 3. As shown in FIG. 15, light emitting elements 24 and 25 each of which has a slit-shaped light emitting surfaces 24a and 25a are secured to a stationary structural member (omitted from illustration) such that the thus secured light emitting elements 24 and 25 confront the positions sensors 22 and 23. According to this embodiment, when the lens support frame 3 is moved in the direction of, for example, the Y-axis, a signal is generated from the position sensor 23, the signal representing the instantaneous position of the lens supportframe 3 in the direction Y. On the other hand, when the lens support frame 3 is moved in the direction X, a signal is generated from the position sensor 22, the signal representing the instantaneous position of the lens support frame 3 in the direction X. Therefore, an advantage that the weight and the size of the camera can be reduced with respect to those of the camera according to the embodiment shown in FIG. 9 can be obtained by employing the position sensor comprising a semiconductor device or the like as the means for detecting the movement of the lens support frame 3 according to this embodiment.

As for the positions at which the position sensors 22 and 23 are secured to the lens support frame 3, it is preferable, as shown in FIG. 16, that the Y-direction position sensor 23 is secured at the position on the X-axis perpendicular to the optical axis, while the X-direction position sensor 22 is secured at the position on the Y-axis perpendicular to the optical axis. The reason for this lies in that: since a downward electromagnetic force generated by the coil 6 with the lens which is placed at an eccentric position includes lateral component $F_R$, the angular moment caused from the lateral component $F_R$ acts on the lens support frame 3. Therefore, if the position sensor 22 is secured at positions B and C in FIG. 16, the value about the vertical movement of the lens support frame 3 becomes different between the value detected at position B and the same at position C.

Referring to FIG. 16, symbol $C_F$ represents the center of the aperture of the camera (that is, the center of the surface of the film), $C_F$ serving as an optical axis when the camera is faced upward. Symbol $C_L$ represents the optical axis of the lens which is deviated in the direction X with respect to the film center $C_F$. When energy is supplied to the coil 6 in order to downward move the lens support frame 3, electromagnetic force $F_C$ generated in the coil 6 acts on point A as shown in FIG. 16 since the center of the lens support frame 3 does not coincide with film center $C_F$. When electromagnetic force $F_C$ is considered to be decomposed into force $F_D$ which is parallel with a segment connecting point A and lens optical axis $C_L$ and force $F_R$ in the horizontal direction, $F_D$ acts to move the lens support frame 3 linearly, while $F_R$ acts to rotate the lens support frame 3 relative to lens center $C_L$.

In this case, the position of the lens support frame 3 is controlled as follows:

Since the lens support frame 3 is moved in directions X and Y by force $F_D$, the motion of it in the direction Y is detected by the position sensor 22 so as to control the electric current to be supplied to the coil 6. Furthermore, the motion of the same in the direction X is detected by the position sensor 23 so as to supply an electric current to the coil 8 in order to make the coil 8 generate an electromagnetic force which can countervail the force in the direction X. As a result, the movement of the lens support frame 3 in the direction X is restricted.

On the other hand, a linear moving force in the $-X$ direction and an angular moment relative to lens center $C_L$ are applied to the lens support frame 3 by force $F_R$. Therefore, the movement of the lens support frame 3 in the direction $-X$ is detected by the position sensor 23 in such a manner that no force in the $-X$ direction is applied to the lens support frame 3. Furthermore, the electric current to be supplied to the coil 8 is restricted.

If the position sensor 22 is secured to the lens support frame 3 on Y-axis passing the center of the lens 2, no adverse affect of the angular moment due to force $F_R$ is effected. As a result, the output from the position sensor 22 does not include any error caused from the above-described angular moment.

However, if the center of gravity of the lens support frame 3 is not positioned on the Y-axis, the output from the position sensor 22 inevitably includes the error caused from the angular moment due to force $F_R$. However, since the error in the center of gravity is, in general, reduced extremely, the error can be neglected.

Then, an exposure mode determining means according to the present invention will be described with reference to FIGS. 1 to 8 and embodiments shown in Tables 1 to 3.

It is necessary for the camera equipped with the device to prevent image blurs as described above to employ "a region in which the camera shake can be compensated for the purpose of preventing image blurs" as a variable for determining the exposure mode in addition to the result of the photometry and the measurement of the distance.

Table 1 shows the simplest exposure-mode determining means that is arranged such that the exposure conditions are changed in accordance with a fact that whether or not the camera shake can be compensated by the device to prevent image blurs.

TABLE 1

| Camera shake can be compensated (amount of deviation) ≦ (compensatable region) | Camera shake cannot be compensated (amount of deviation) > (compensatable region) |
|---|---|
| Outdoor daylight photography (AE) | Flash photography (FA) |

According to the exposure mode determining means shown in Table 1, either the <outdoor daylight photography (AE) at a shutter speed (shutter open time) determined by the results of the photometry> or <flash photography (FA) at a predetermined shutter speed> is selected in accordance with the fact that the intensity of the camera shake or the vibration can be compensated by the device to prevent image blurs.

That is, if the camera shake is within a region in which the camera shake can be compensated by the device to prevent image blurs for the purpose of preventing image blurs, the outdoor daylight photography is conducted with the shutter speed determined by the results of the photometry since there is no fear of the image blurs. If the camera shake cannot be compensated by the device to prevent image blurs, a predetermined shutter speed with which shutter open time is shortened is employed in order to overcome the camera shake and lacking for exposure caused therefrom is compensated by flash light. As a result, the camera shake which cannot be compensated by the device to prevent image blurs can be compensated by the above-described exposure mode.

Table 2 shows the exposure mode determining means, the method being capable of corresponding to a further complicated photography conditions.

TABLE 2

| | <Deviation> and <Compensatable region> | |
|---|---|---|
| <1> and <2GN/F> | Camera shake can be compensated <deviation> ≦ <Compensatable region> | Camera shake cannot be compensated <deviation> > <Compensatable region> |
| light can reach subject (1 ≦ 2GN/F) | Outdoor daylight photography (AE) | Flash photography (FA) |
| Flash light cannot reach subject (1 > 2GN/F) | Outdoor daylight photography (AE) | <when distance 1 is finite> Outdoor daylight photography (AE) <when distance 1 is substantially infinite> Outdoor daylight photography (AE) |

Referring to Table 2, symbol 1 represents the distance to the subject, GN represents the guide number of the flashgun, and F represents the F-number of the lens in the photographic optical system.

According to the exposure mode determining method shown in Table 2, the exposure mode is determined in accordance with the fact whether or not the camera shake can be compensated by the device to prevent image blurs and the distance to which flash light can reach. Therefore, the method can correspond to further complicated photography conditions than the conditions which can be allowed to correspond by the exposure mode determining means shown in Table 1.

That is, if the camera shake is within a region in which the camera shake can be compensated by the device to prevent image blurs for the purpose of preventing image blurs, there is no fear of image blurs similarly to the case shown in Table 1. Therefore, the outdoor daylight photography is as it is conducted. However, it the camera shake cannot be compensated by the device to prevent image blurs, an exposure mode is selected from a group consisting of the following three exposure modes in accordance with the subject distance: in the case where the subject distance is within the distance to which flash light can reach, the flash photography is, similarly to the case shown in Table 1, conducted with a specified shutter speed since the lack of ambient light for proper exposure can be compensated by flash light even if the shutter speed is arranged to be a relatively high speed for the purpose of preventing image blurs.

However, in the case where the subject distance is longer than the distance to which flash light can reach, the lack of natural light for exposure cannot be compensated by flash light if the shutter speed is arranged to be the specific speed. In this case, an exposure mode is selected in accordance with the fact whether or not the subject distance is infinite. If the subject distance is not infinite, a certain effect of flash light can be expected. Therefore, flash photography with high shutter speed is conducted for the purpose of preventing image blurs. Furthermore, the outdoor daylight photography is conducted for the purpose of compensating the lacking for exposure although flash light is used. On the other hand, if the subject distance is infinite, any considerable effect cannot be expected from the use of flash light. What is worse, the flash light reflected by fog or dust can causes a critical problem for the quality of the picture. Therefore, normal photography is conducted as an alternative to the flash photography.

In this description made above, the description "infinite subject distance" does not strictly mean the infinite distance, the infinite subject distance being used in the description above to represent a distance which is treated as "an infinite subject distance" by a focal point adjuster of the camera in which the focal point is adjusted in accordance with the performance of the photography optical system of the camera. For example, in the case where the photography optical system is arranged to have a focal distance of 80 mm, a distance longer than 15 m may be arranged to be the "infinite subject distance".

Table 3 shows a photography conditions using a self-timer. In general, since a camera is supported by a stationary body such as a tripod when photography by using a self-timer is conducted, it is expected that no camera shake is generated except for extremely severe conditions such as those in a construction field. In other words, the possible camera shake in the photography using a self-timer is always restricted within a region in which the camera shake can be compensated by the device to prevent image blurs. Therefore, according to the exposure mode determining methods shown in Tables 1 and 2, the normal outdoor daylight photography in accordance with the result of photometry is always conducted in the photography using a self-timer. According to the exposure mode determining methods shown in Tables 1 and 2, photography using a self-timer is conducted in the outdoor daylight photography mode in which the shutter release time is arranged to be lengthened when the outdoor light is insufficient, the outdoor daylight photography being without flash light.

On the other hand, in the actions of photography using a self-timer, user usually becomes a subject of the photography. Therefore, there rises a possibility of "subject shake" since the subject, that is, human moves if the shutter release time is arranged to be too long. Therefore, in an action of the outdoor photography using a self-timer and in which the shutter release time is arranged to be relatively long, there arises a fear of the "subject shake" as an alternative to the "camera shake", causing a photograph in which the subject, that is, human is shaken in the frame although the background is not shaken.

Because of the above-described reasons, an exposure mode determining method needs to be added to the methods shown in Table 2 in order to correspond to an action of photography using a self-timer.

Table 3 shows the exposure mode determining method structured so as to correspond to an action of photography using a self-timer.

TABLE 3

| | <Deviation> and (compensatable region) | | |
|---|---|---|---|
| <1> and <2GN/F> | Camera shake can be compensated <Deviation> ≦ <Compensatable region> and camera shake can be compensated at photography using self-timer with relative high AE speed. | Camera shake cannot be compensated <Deviation> > <Compensatable region> | Camera shake can be compensated at photography using self-timer with relative slow Ae speed |
| Flash light can reach subject (1 ≦ 2GN/F) | Outdoor daylight photography (AE) | Flash photography (AE) | Flash photography (FA) |
| Flash light cannot reach subject (1 > 2GN/F) | Outdoor daylight photography (AE) | <When distance 1 is finite> Outdoor daylight photography with a flash (AE) <When distance 1 is substantially infinite> Outdoor daylight photography (AE) | Flash photography (FA) |

According to the exposure mode determining means shown in Table 3, even if the camera shake can be compensated by the device to prevent image blurs, the flash photography at a certain shutter speed is conducted regardless of the fact whether or not the flash light reaches the subject when the shutter speed determined on the basis of the result of the photometry is a relatively low speed at an action of photography using a self-timer. That is, according to Table 3, when photography using a self-timer is conducted, non-flash photography (outdoor daylight photography) AE at a shutter speed determined in accordance with the result of the photometry is selected in the case where the camera shake can be compensated by the device to prevent image blurs and the intensity of outdoor light is sufficient. On the other hand, when the camera shake can be compensated by the device to prevent image blurs and the intensity of the outdoor light is insufficient, flash photography (FA) at a predetermined shutter speed is selected regardless of the distance from the subject, the predetermined shutter speed being used to replace the shutter speed determined in accordance with the result of the photometry.

That is, when the camera shake can be compensated by the device to prevent image blurs and the intensity of the outdoor light is sufficient, there is neither a fear of the "camera shake" nor the "subject shake". Therefore, an action of outdoor daylight photography is as it is conducted in accordance with the result of photometry. However, in the case where the camera shake can be compensated by the device to prevent image blurs and the intensity of outdoor light is insufficient, the "subject shake" cannot be prevented although the "camera shake" can be prevented. Therefore, it needs to arrange the shutter speed to be a specific shutter speed causing short shutter-release time for the purpose of eliminating the influence of the "subject shake". In addition, the lack of ambient for proper exposure is compensated by flash light.

The reason why the flash photography mode with a specific shutter speed is unconditionally selected regardless of the subject distance when the camera shake can be compensated by the device to prevent image blurs and the intensity of outdoor light is insufficient lies in that a user usually becomes a subject in an action of photography using a self-timer even if the subject distance is determined to be infinite by the photometric device. In this case, since the subject distance is 5 to 6 m at the longeset, the lack of ambient light for proper exposure can be sufficiently compensated by using flash light even if the influence of the "subject shake" is eliminated by arranging the shutter speed to be a specific shutter speed.

Therefore, according to the exposure mode determining means shown in Table 3, the possibility of the "subject shake" can be virtually eliminated even if photography using a self-timer is conducted.

Then, the structure and operation of the exposure mode determining means will be described, the exposure mode determining means being capable of executing the exposure mode determining method shown in Tables 1 to 3.

Figure 1:
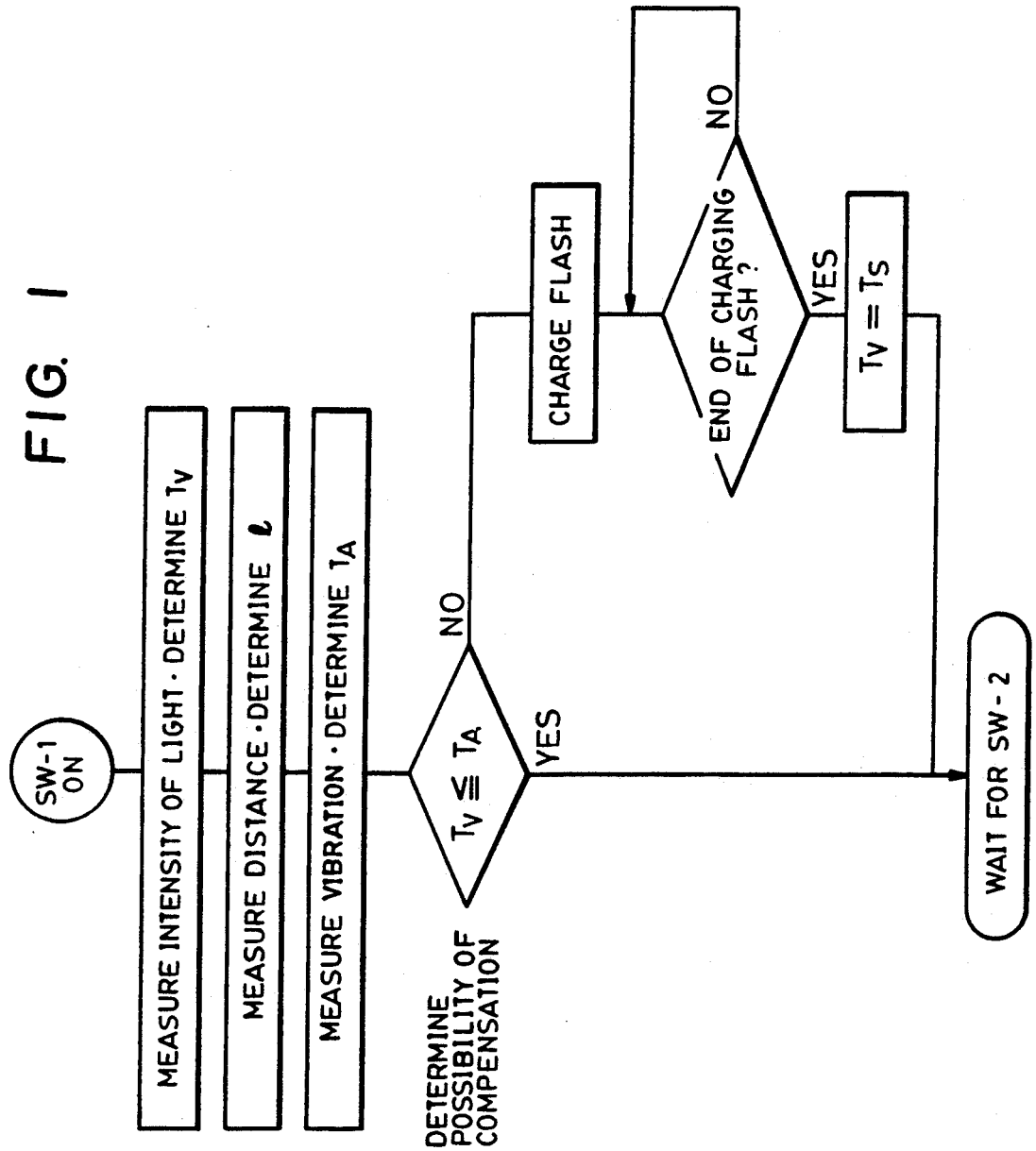
FIGS. 1, 4, and 5 are flow charts which respectively illustrate the operation of first, second, and third embodiments of an exposure mode selection means mounted on a camera according to the present invention.
Figure 4:
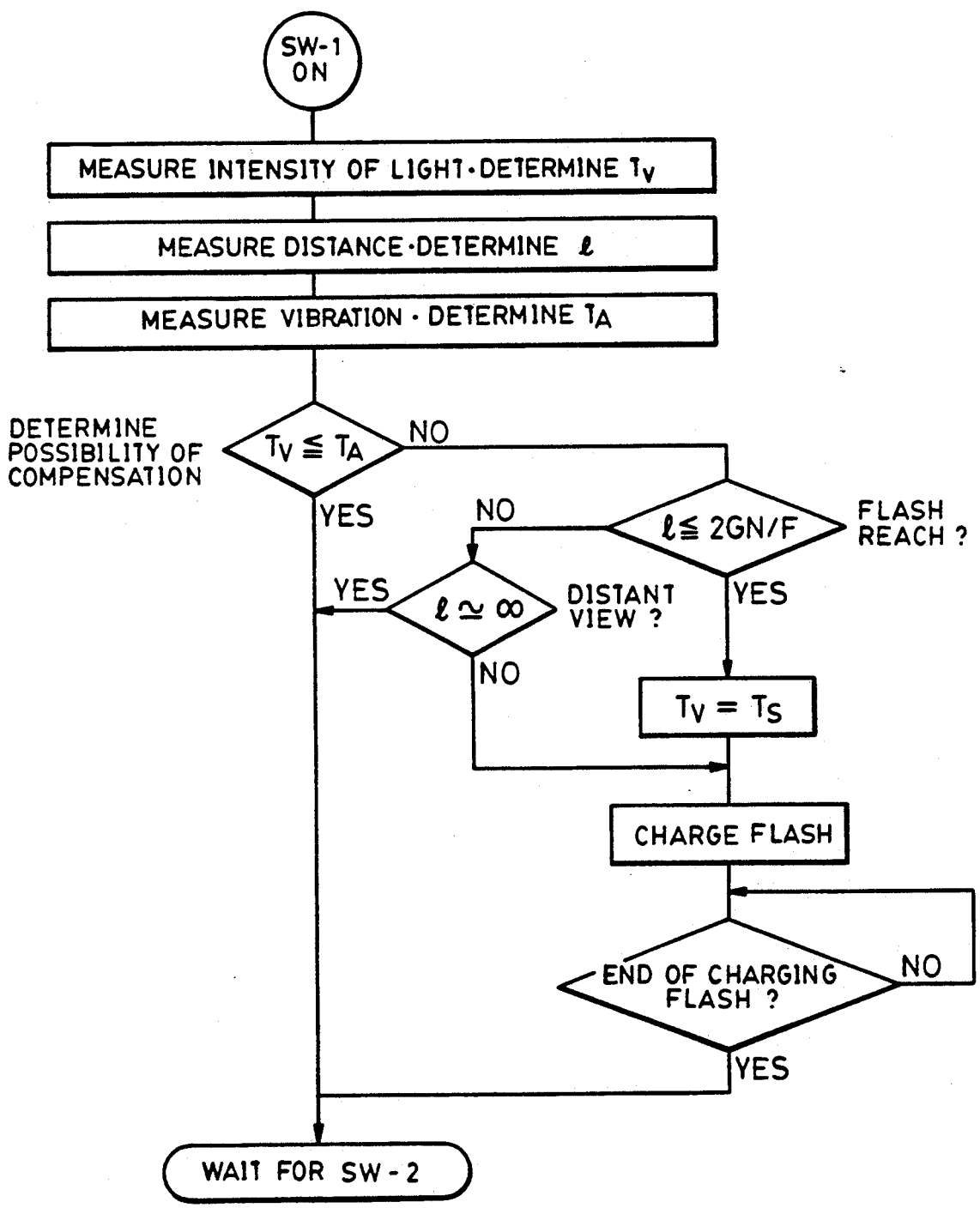
Figures 5, 5A:
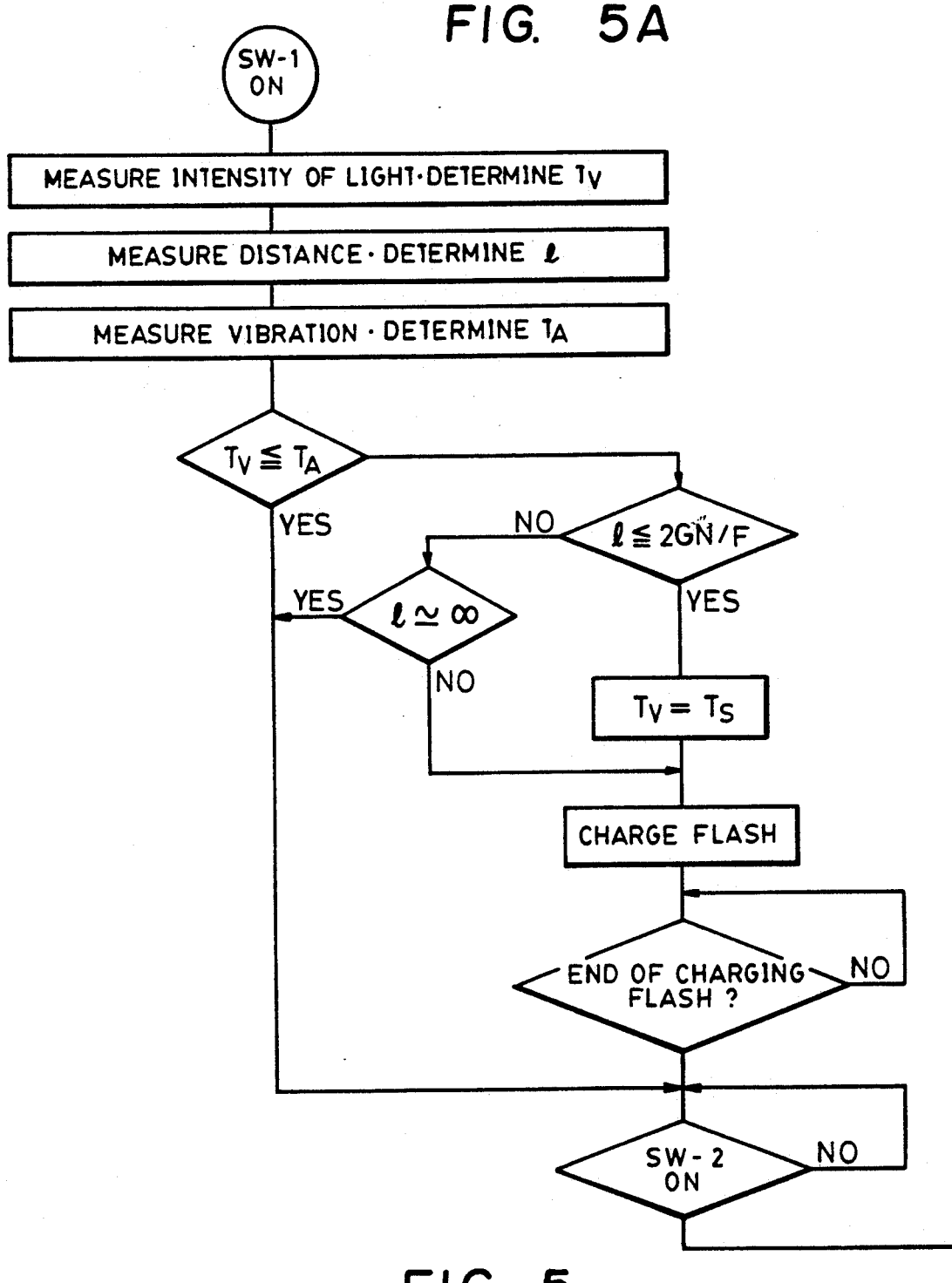

FIG. 1 is a flow chart which illustrates a program for determining the exposure mode which corresponds to the contents shown in Table 1. FIG. 4 is a flow chart which illustrates a program for determining the exposure mode which corresponds to the description shown in Table 2. FIG. 5 is a flow chart which illustrates a program for determining the exposure mode which corresponds to the contents shown in Table 3.

Figure 2:
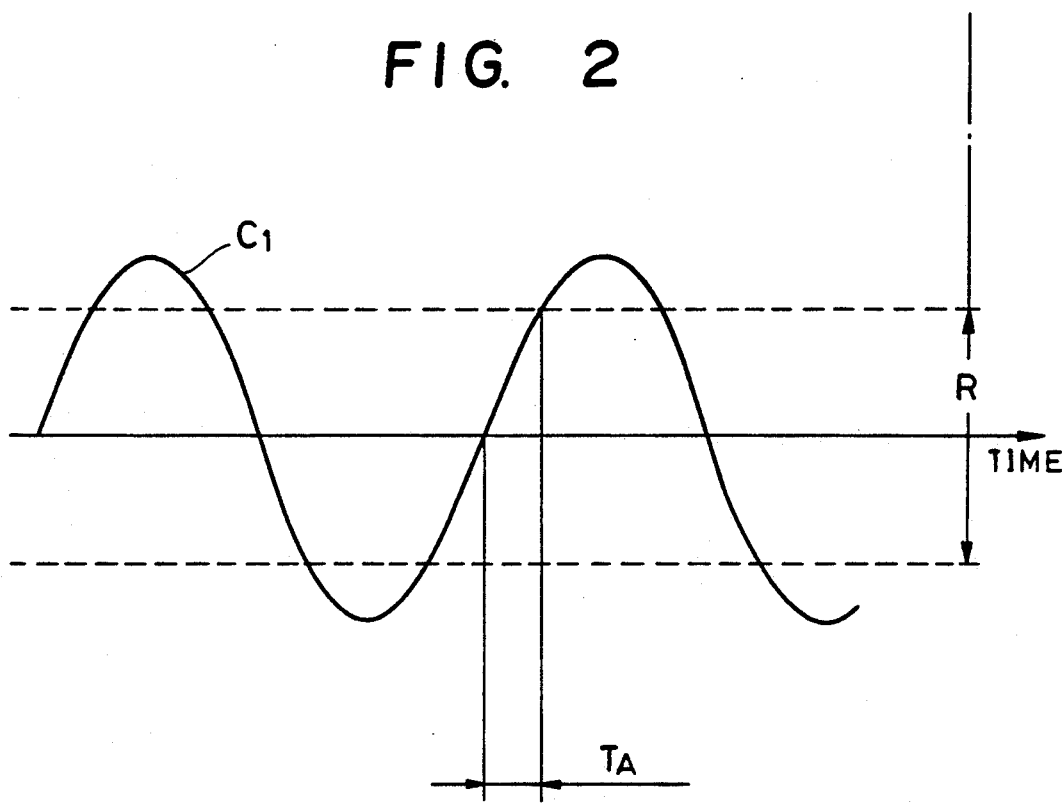
FIGS. 2 and 3 are time curves each of which illustrate one of the factors of the exposure mode selection means shown in FIGS. 1, 4, and 5 (FIG. 5 includes FIGS. 5A and 5B)
Figure 3:
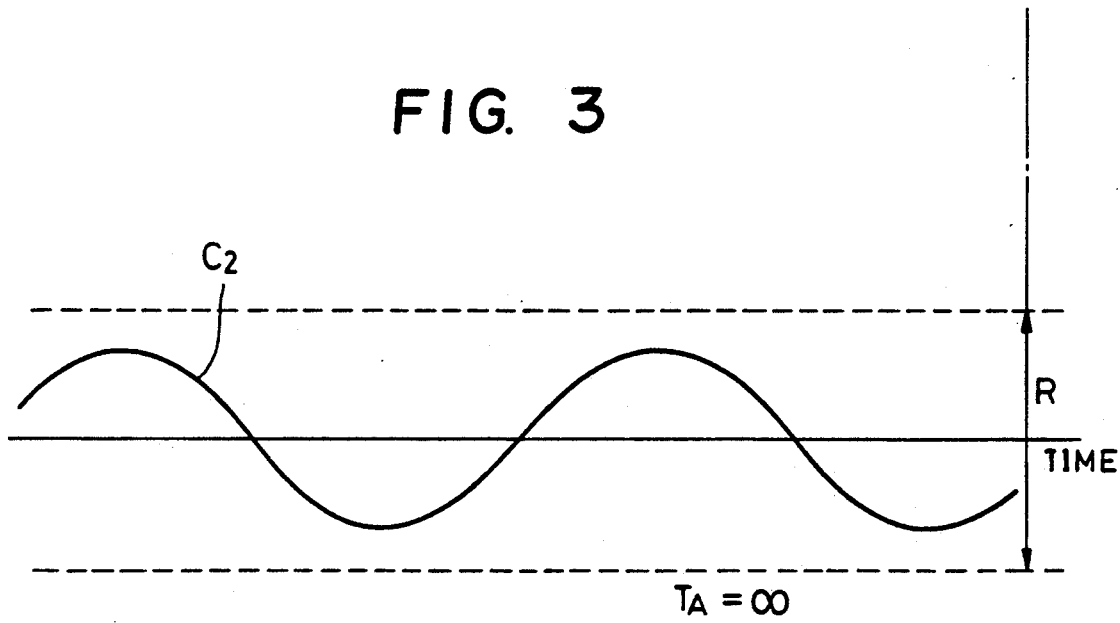

Symbols shown in FIGS. 1, 4, and 5A and 5B represent:

SW-1 a switch to be switched on by a first stroke when the shutter release button of the camera is pressed SW-2 a switch to be switched on by a second stroke when the shutter release button of the camera is pressed SW-3 a switch arranged to act in synchronization with the action of the operation button of the self-timer at an action of photography using the self-timer $T_V$: time in which the shutter is opened (shutter speed), and which is selected in accordance with the result of the photometry l: distance from the subject, the distance being determined in accordance with the result of the range finding $T_A$: time to be described referring to FIGS. 2 and 3 (the region in which the camera shake can be compensated for the purpose of preventing image blurs is shown)

$T_S$: shorter time in which shutter is opened, and which is previously determined in flash photography (a specific shutter speed at flash photography) in order to prevent image blurs F: lens aperture (F-number) of the photographic optical system GN: guide number of the flashgun 2GN/F: practical distance to which the flash light can reach FIGS. 2 and 3 are graphs which illustrate the meaning of $T_A$. Referring to these drawings, symbols $C_1$ and $C_2$ represent the changes in the amplitude of the camera shake in accordance with the time elapse, and R represents the region in which the camera shake can be compensated for the purpose of preventing image blurs (that is, the region in which the above-described lens 2 can be moved perpendicular to the optical axis) in the device to prevent image blurs (the vibration isolating device).

FIG. 2 is a view which illustrates a case in which the maximum amplitude of the camera shake exceeds region R in which the camera shake can be compensated for the purpose of preventing image blurs in the device to prevent image blurs. FIG. 3 is a view which illustrates a case in which the maximum amplitude of the camera shake is restricted within region R in which the camera shake can be compensated for the purpose of preventing image blurs in the device to prevent image blurs.

In the camera according to the this embodiment, when the maximum amplitude of the camera shake exceeds, as shown in FIG. 2, region R in which the camera shake can be compensated for the purpose of preventing image blurs in the device to prevent image blurs, time $T_A$ is calculated on the basis of the outputs from the camera shake detection means 18 and 19 as shown in FIG. 9, $T_A$ represents a time period from the time when the amplitude is zero to the time when the same reaches the upper limit of the region R in which the camera shake can be compensated for the purpose of preventing image blurs in the device to prevent image blurs. Furthermore, time $T_A$ is used as a reference value for making a determination of a fact whether or not the camera shake can be compensated so that the most suitable exposure is determined. On the other hand, when the maximum amplitude of the camera shake is, as shown in FIG. 3, restricted within region R in which the camera shake can be compensated for the purpose of preventing image blurs in the device to prevent image blurs, the value of time $T_A$ becomes $T_A = \infty$. Furthermore, if the maximum amplitude of the camera shake extremely exceeds the upper limit of the above-described region, $T_A \approx 0$ since the gradient of the camera-shake curve becomes abrupt.

Then, the operation of this embodiment of the exposure mode determining means according to the present invention will be described with reference to Table 1 and the flow chart shown in FIG. 1.

When the user of the camera presses the shutter release button (omitted from illustration) with a light load applied at the action of photography, the switch SW-1 is switched on. In response to a signal representing the fact that the switch SW-1 has been switched on, the photometry circuit 26 shown in FIG. 14 is actuated so that photometry is conducted. As a result, shutter speed $T_V$ (time in which the shutter is opened) corresponding to the result of the photometry is determined. Then, the range finding circuit 27 shown in FIG. 14 is actuated so that the range finding is conducted. As a result, range l is determined, and then the camera shake detection means 18 and 19 shown in FIG. 14 are actuated so that the camera shake is detected and $T_A$ is calculated by the deviation-compensation circuits 20 and 21. Then, a fact whether or not $T_V \leq T_A$ is determined. If $T_V \leq T_A$, the outdoor daylight photography AE (the outdoor daylight photography in which the shutter open time, that is, shutter speed is determined in accordance with the result of the photometry) is selected and the second stroke operation of the shutter release button is waited for {switching of the switch SW-2 (omitted from illustration) is waited for}. In this case, the device to prevent image blurs is operated so that the image blurs on the image surface are prevented. That is, a predetermined electric current (which corresponds to the output from the camera shake detection means 18 and 19) is supplied to the coils 6 and 8 respectively by the camera shake compensation circuits 20 and 21. As a result, the lens support frame 3 integrated with the coils 6 and 8 is moved vertically or laterally, causing the image blurs on the image surface to be prevented. The distance of movement (or the moving speed) of the lens support frame 3 is detected by the intensity of an induced electromotive force generated in the coils 10 and 12 so that the instantaneous position of the lens support frame 3 is controlled by a servo system formed by the coils 6, 10, the camera shake compensation circuit 20, and by another servo system formed by coils 8, 12, and the camera shake compensation circuit 21.

On the other hand, if $T_V > T_A$, the fact that camera shake can be completely compensated by the device to prevent image blurs is determined, causing the flash photography to be automatically selected regardless of the results of the photometry. In addition, shutter speed $T_V$ which has been previously determined in accordance with the result of the photometry is switched to the predetermined specific speed $T_S$ for use in flash photography.

Then, a second embodiment of the exposure mode determining means according to the present invention will be described with reference to Table 2 and FIG. 4. Since the process to make a determination of the fact whether or not the camera shake can be completely compensated by $T_A$ is the same as that for the first embodiment, the operation to this stage is omitted from description.

According to the exposure mode determining means shown in Table 2, the practical range 2GN/F to which flash light can reach and found range (distance from a subject) l are used as the factors for determining the exposure mode. Therefore, the flow chart or this method of determining the exposure is arranged to be different in part from the flow chart for the method of determining the exposure shown in Table 1. That is, according to the flow chart shown in FIG. 4, if it is determined that the camera shake exceeds the region in which the camera shake can be compensated by the device to prevent image blurs for the purpose of preventing image blurs, the outdoor daylight photography is selected as an alternative to the flash photography only in the case where subject distance l is larger than range 2GN/F to which flash light can reach and l is substantially finite. Although the range GN/F to which flash light can reach is obtained from calculations, the practical value of 2GN/F is employed here upon the consideration of the latitude of the negative film and the incidental light from the circumference.

Figure 5B:
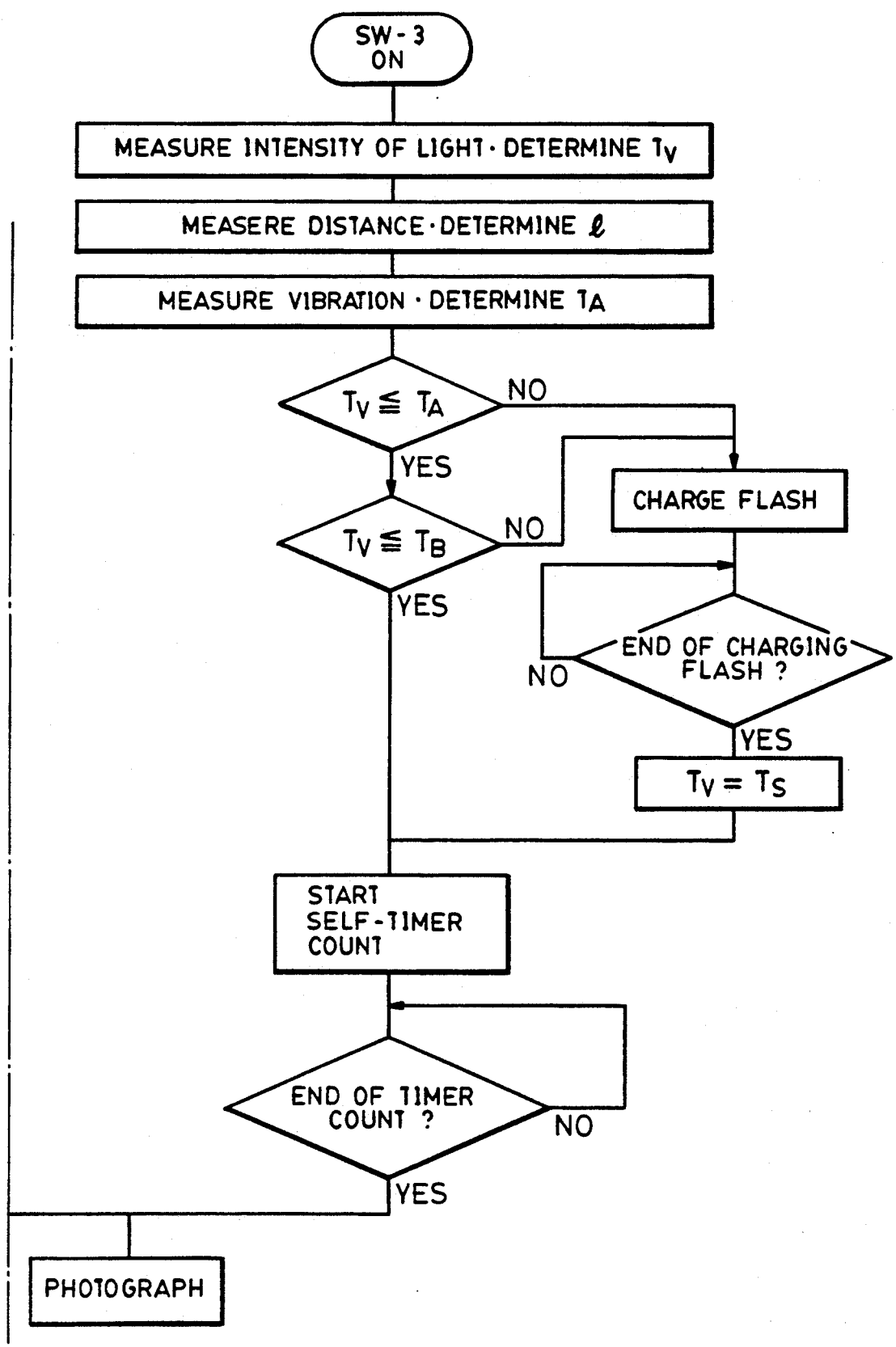

A flow chart shown in FIGS. 5A and 5B is the flow chart for use in the exposure mode determining means shown in Table 3, the flow chart shown in FIGS. 5A and 5B being arranged such that a flow for determining the exposure mode when a self-timer is used is added to the flow chart shown in FIG. 4. Therefore, description about the flow chart shown in FIG. 5 is made for the right half portion only, i.e., FIG. 5B.

When photography with a self-timer installed to the camera according to the present invention is conducted, the switching of the self-timer causes, similarly to the above-described case, for light, range, and camera shake to be respectively detected. Furthermore, $T_V$, l, and $T_A$ are determined, and then a fact whether or not the camera shake can be compensated is determined from the result of a comparison made between $T_V$ and $T_A$. If the camera shake cannot be completely compensated ($T_V > T_A$), flash photography using a self-timer is selected. In this case, shutter speed $T_S$ which is suitable for the flash photography is selected as an alternative to the shutter speed determined in accordance with the result of the photometry.

If the camera shake can be compensated ($T_V \leq T_A$), a comparison between time $T_B$ in which there is a fear of the subject shake and $T_V$ is made. If $T_V \leq T_B$, it is determined that the compensation can be conducted, causing a picture in which the subject shake is prevented to be taken. Then, the time counting with the self-timer is started. If $T_V > T_B$, it is determined to be out the region in which a photograph without no "subject shake" can be taken and the flash photography with a specific shutter speed $T_S$ using a self-timer is conducted similarly to the case in which $T_V > T_B$.

Then, an embodiment of the structure of the exposure mode determining means in which the flow chart shown in FIG. 1 is executed will be described with reference to FIGS. 6A and 6B.

Figure 6B:
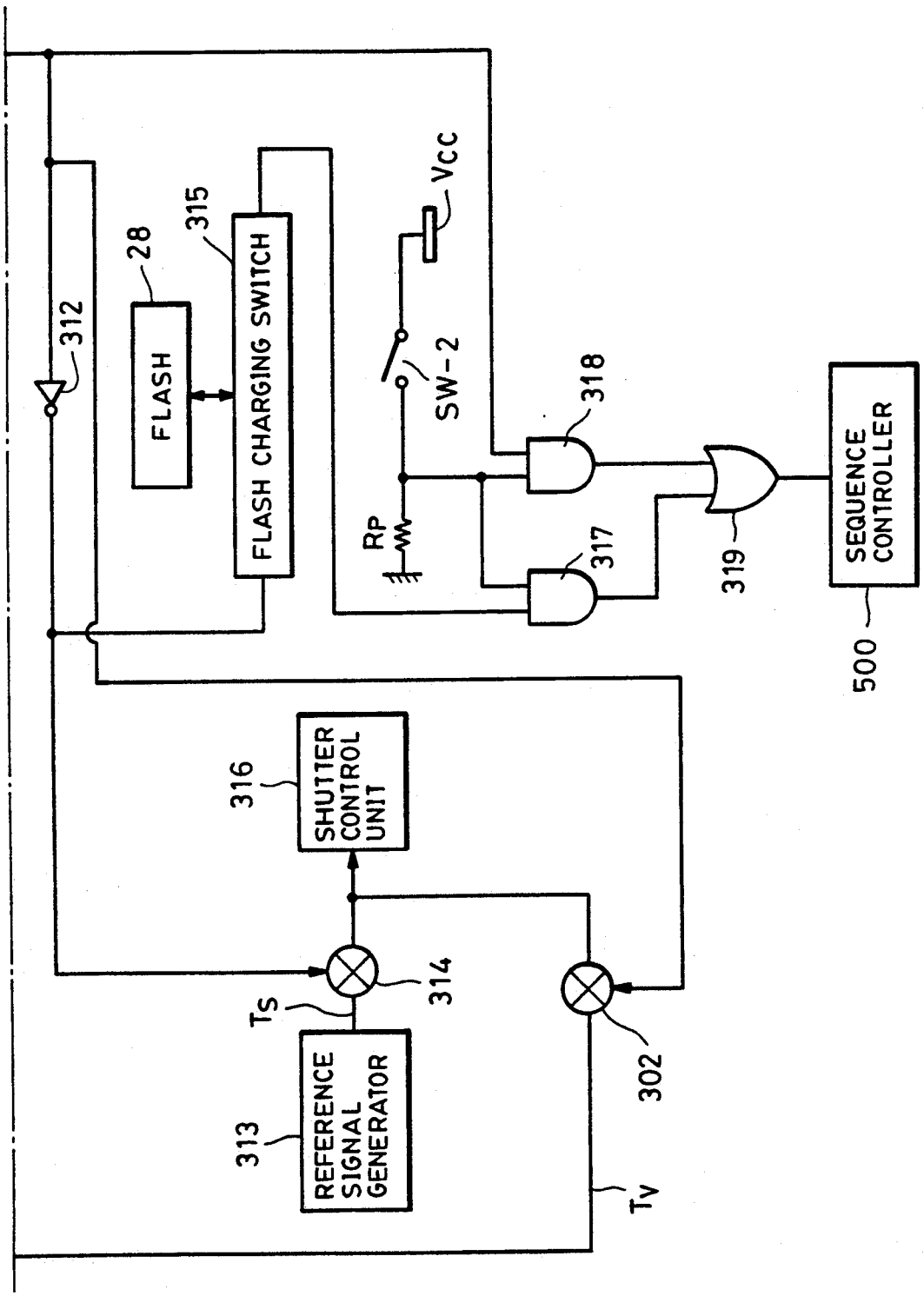
FIG. 6 includes FIGS. 6A and 6B, which are block diagrams illustrating the first embodiment of the exposure mode selection means according to the present invention and corresponding to the flow chart shown in FIG. 1.

Referring to FIGS. 6A and 6B, symbol SW-1 represents the switch which is arranged to be switched on when the shutter release button is pressed by the first stroke, and SW-2 represents the switch which is arranged to be switched on when the shutter release button is pressed by the second stroke, the switches SW-1 and SW-2 respectively having an end which is connected to $V_{CC}$ serving as a power supply voltage and another end which is grounded via pull-down resistor $R_P$. Reference numeral 26 represents the known photometry circuit which has been described with reference to FIG. 14. Reference numeral 27 represents the known range-finding circuit shown similarly in FIG. 14, and symbol S represents a constant voltage power source capable of supplying bias voltage to various electronic circuits. Reference numeral 18 represents the means for detecting camera shake shown in FIG. 14, the camera-shake detecting means 18 comprising a gyrostabilizer or the like (although only the camera shake detecting means 18 is shown in FIG. 6A, another camera shake detecting means may be connected to the circuit shown in FIG. 6A). Reference numeral 400 represents an auto focus control system, and 500 represents a photographic sequence controller capable of controlling the operation sequence of the portions of the camera so as to cause the photography action. Reference numerals 301, 302, and 314 represent known analog switches, 18A represents an integrator capable of integrating the output from the camera-shake detection means 18, and 20 represents the camera-shake compensation circuit shown in FIG. 14. Reference numeral 28 represents the flashgun shown in FIG. 14, and 315 represents a flash charging device capable of charging the flashgun 28. Referring to FIG. 6A, the elements numbered from 300 to 309 are the elements of the exposure mode determining means according to this embodiment. The elements given the other numbers are not the elements of the means for selecting the exposure mode but are the elements related to the means for selecting the exposure mode. Reference numeral 304 represents a gate circuit for taking in angular velocity v generated by the camera-shake detection means 18. Reference numeral 310 represents a gate control circuit capable of controlling time in which the gate is opened (that is, sampling time). Reference numeral 305 represents an A/D converter capable of converting angular velocity v taken by the gate circuit 304 into a digital value. Reference numeral 306 represents an arithmetic circuit capable of calculating maximum value $V_{max}$ from the angular velocity signal taken by the gate 304 so as to transmit the thus calculated maximum value $V_{max}$. Reference numeral 311 represents a reference signal generator capable of generating a voltage which corresponds to region R (the maximum region in which the lens 2 can be moved) in which the camera shake can be compensated for the purpose of preventing image blurs shown in FIG. 2, the voltage being generated as a reference signal. Reference numeral 308 represents a division circuit capable of generating, as an output, time $T_A$ (time representing the shutter speed with which the camera shake can be compensated) which is taken to realize a movement by R at speed $V_{max}$, $T_A$ being generated by dividing the reference signal by the output from a D/A converter 307. Reference numeral 309 represents a comparator capable of comparing shutter speed $T_V$ which corresponds to the result of the photometry and the above-described $T_A$. Reference numeral 313 represents a reference signal generator capable of generating an output which represents shutter speed $T_S$ at the action of the flash photography. Reference numeral 316 represents a known shutter-control circuit.

The operation of an exposure mode automatic selection means having the structure described above will be described.

When the user presses the release button of the camera with a light load, the switch SW-1 is switched on, causing the analog switch 301 to be switched on. As a result, the power source S is connected to the photometry circuit 26, the range finding circuit 27, and the camera shake detection means 18 so that the two circuits 26, 27 and the camera shake detection means 18 are operated. Therefore, the range finding is conducted by the range finding circuit 27, while the camera shake is detected by the camera shake detection means 18. In the photometry circuit 26, a signal representing shutter speed $T_V$ which corresponds to value EV of the brightness of the subject is supplied to the analog switch 302 and the comparator 309.

On the other hand, when the range finding circuit 27 is operated and thereby the range finding is conducted, the range finding circuit 27 generates found range l as an output. In response to the thus transmitted signal, the focus control circuit 400 is caused to operate so that auto focusing is conducted.

Angular velocity signal v generated by the camera shake detection means 18 is taken in by the gate circuit 304 for a predetermined sampling time. Then, it is converted into a digital signal by the A/D converter 305 before maximum value $V_{max}$ in a predetermined time period (for example, in one second) is calculated by the arithmetic circuit 306. Output $V_{max}$ from the arithmetic circuit 306 is converted into an analog signal by the D/A converter 307 before the value of $T_A$ is calculated by the division circuit 308. As a result, the output representing $T_A$ is supplied to the comparator 309.

In the comparator 309, a comparison between $T_A$ and $T_V$ is made so that output "H" is generated by the comparator 309 when $T_V \leq T_A$, while output "L" is generated when $T_V > T_A$.

When output "H" is generated by the comparator 309, either of the inputs of an AND gate 318 becomes "H" so that output "H" is transmitted from an OR gate 391 when the switch SW-2 is switched on. As a result, the photography sequence control means 500 is caused to conduct the photography operation. In this case, since the output from an NOT gate 312 is "L", a flash switch device 315 is not operated. As a result, flash photography is not selected, but the outdoor daylight photography is selected. Furthermore, since the output from the NOT gate 312 is "L", the analog switch 314 does not supply output $T_S$ from the reference signal generator 313 to the shutter control circuit 316.

On the other hand, since the output from the comparator 309 is "H", output $T_V$ from the photometry circuit 26 is supplied through the analog switch 302 to the shutter control circuit 316.

Therefore, the shutter mechanism can be operated at the shutter speed which corresponds to the result of the photometry.

On the other hand, the output from the camera shake detection means 18 is supplied to the integrator 18A which is then transmits angular displacement $\theta$ of the lens support frame 3 around the X-axis to the camera shake compensation circuit 20. Therefore, the camera shake compensation circuit 20 controls the electric current to be supplied to the coil 6 in accordance with the output from the integrator 18A and as well controls the electric current to be supplied to the coil 6 in accordance with the output voltage from the coil 10. As a result, the camera shake compensation is conducted so that the image blurs on the image surface is prevented even if the camera is shaken.

When $T_V > T_A$, since the output from the comparator 309 becomes "L", either of the inputs of the AND gate 318 becomes "L". Therefore, if the user of the camera presses the shutter release button to the second stroke to close the switch SW-2, the output from the AND gate 318 does not become "H". However, the output from the NOT gate 312 becomes "H", the analog switch 314 acts so as to cause output $T_S$ from the reference signal generator 313 to be supplied to the shutter control circuit 316. As a result, the shutter control circuit 316 conducts a control such that the shutter mechanism (omitted from illustration) is operated at specific shutter speed $T_S$ which is suitable for the flash photography. At this time, the analog switch 302 does not cause output $T_V$ from the photometry circuit 26 to be supplied to the shutter control circuit 316 since the output from the comparator 309 is "L". Furthermore, since the output from the NOT gate 312 becomes "H", the flash charging device 315 starts the charging of the flashgun 28. When the charging of the flashgun 28 is completed, the output from the flash switch device 315 becomes "H". As a result, when the user of the camera presses the shutter release button to the second stroke to switch on the switch SW-2, the output from the AND gate 317 becomes "H". As a result, the output from the OR gate 319 becomes "H", causing the photography sequence control means 500 to be operated. That is, when $T_V > T_A$, although the device to prevent image blurs is operated, the flash photography at a specific shutter speed is selected regardless of the result of the photometry.

As described above and according to the exposure mode determining means according to the first embodiment, the exposure mode determining means shown in Table 1 and FIG. 1 is performed.

Figures 7, 7A:
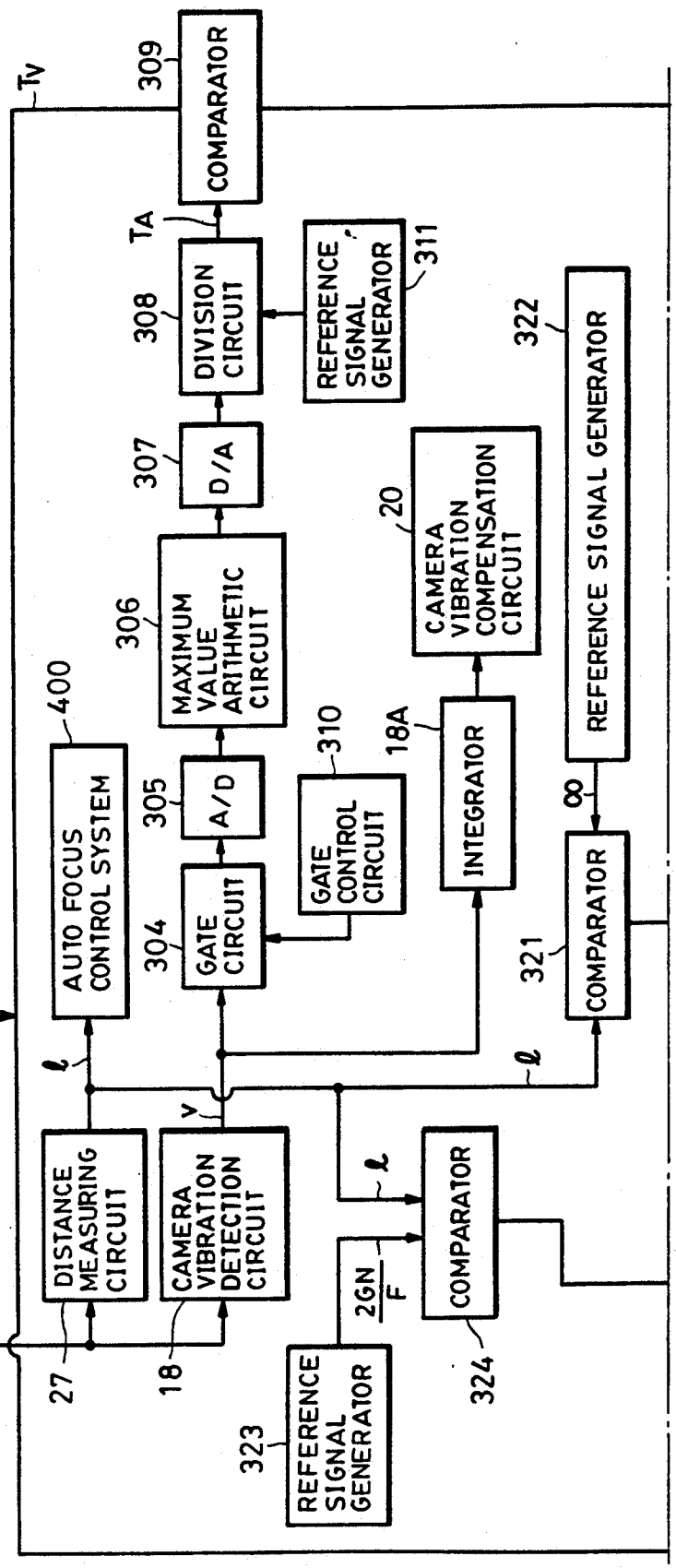
FIG. 7 includes FIGS. 7A and 7B which are block diagrams illustrating the second embodiment of the exposure mode selection means according to the present invention and corresponding to the flow chart shown in FIG. 4.
Figure 7B:
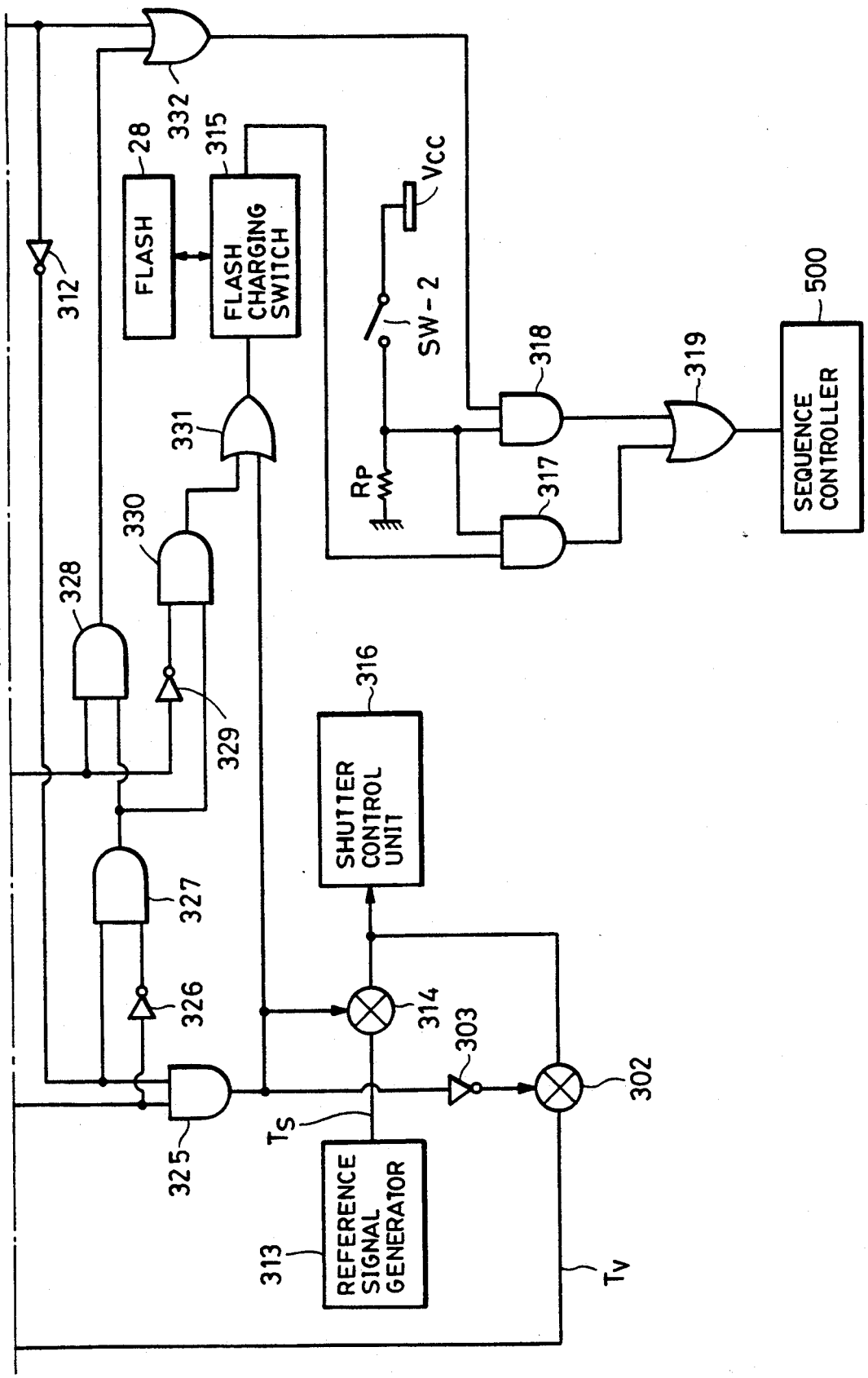

FIGS. 7A and 7B illustrate a means for conducting the exposure mode determining means shown in Table 2 and FIG. 4. Referring to the drawing, the elements given the same numerals or symbols are the same as those shown in FIGS. 6A and 6B. The exposure mode determining means according to this embodiment is characterized in that a logical system capable of corresponding to the result of the range finding is added to the structure shown in FIGS. 6A and 6B.

Referring to FIGS. 7A and 7B, reference numeral 322 represents a reference signal generator capable of generating a reference signal representing infinite distance $\infty$. Reference numeral 323 represents a reference signal generator capable of generating an output representing 2GN/F. Reference numerals 321 and 324 represent comparators, 325, 327, 328, and 330 represent AND gates, 331 and 332 represent OR gates, and 303, 326, and 329 represent NOT gates. The logical system capable of conducting the flow shown in the lower right half of the flow shown in FIG. 4 is formed by the above-described elements.

Referring to FIGS. 7A and 7B, when the user of the camera presses the shutter release button by the first stroke, the switch SW-1 is switched on so that the photometry and range finding are conducted and as well the camera shake detection means 18 is started. Similarly to the above-described embodiment, shutter speed $T_V$ which corresponds to the result of the photometry is supplied to the comparator 309 in which a comparison between shutter speed $T_A$ obtained from the output from the camera shake detection means and $T_V$ is made. If $T_V \leq T_A$, the output from the comparator 309 becomes "H" so that input "H" is supplied to either of the inputs of the AND gate 318 via the OR gate 332. That is, similarly to the above-described embodiment, the outdoor daylight photography mode is selected so that the photography status in which the image blurs due to the camera shake can be compensated by the device to prevent image blurs is realized.

On the other hand, output l from the range finding circuit 27 is subjected to a comparison with output 2GN/F from the reference signal generator 323, the comparison being made in the comparator 324. If $l \leq 2GN/F$, the output from the comparator 324 becomes "H". However, if $l > 2GN/F$, the output "L" from the comparator 324 is retained as it is.

The output from the range finding circuit 27 is supplied to the comparator 321 in which it is then subjected to a comparison with the output from the reference signal generator 322. The comparator 321 generates output "H" if input l from the range finding circuit 27 is the same as output $\infty$ from the reference signal generator 322. If l is smaller than $\infty$, the output is retained at "H".

According to the device shown in FIGS. 7A and 7B, input signal "H" is supplied only in the following two cases for the purpose of operating the flash switch device 315.

(i) When the output from the comparator 309 is "L", the output from the comparator 324 is "L", and the output from the comparator 321 is "L"
(ii) When the output from the comparator 309 is "L", the output from the comparator 324 is "H", and the output from the comparator 321 is "L"

In the case (i), a state is expressed in which $T_V > T_A$ (camera shake can be completely compensated by the device to prevent image blurs), $l > 2GN/F$ (the distance from the subject is longer than the distance to which flash light can reach), and $l \neq \infty$ (distance from the subject is not infinite).

In the case (ii), a state is expressed in which camera shake can not be completely compensated by the device to prevent image blurs, the distance from the subject is shorter than the distance to which flash light can reach, and distance from the subject is not infinite.

In the photography conditions shown in (i), since the output from the AND gate 325 is "L", the analog switch 314 does not supply output $T_S$ from the reference signal generator 313 to the shutter control circuit 316. On the other hand, since the output from the NOT gate 303 is "H", it causes the analog switch 302 to supply the output $T_V$ from the photometry circuit 26 to the shutter control circuit 316. Therefore, flash photography with usual AE is conducted as an alternative to the flash photography with a specific shutter speed.

However, in the case (ii), since the output from the AND gate 325 is "H", the analog switch 314 acts so as to make output $T_S$ from the reference signal generator 313, that is, a signal representing a specific shutter speed to be supplied to the shutter control circuit 316, the specific shutter speed being arranged for the flash photography. Therefore, the shutter speed is determined to be relatively slow speed $T_S$ for the purpose of conducting the flash photography. In this case, since the output from the NOT gate is "L", the analog switch 302 does not cause output $T_V$ from the photometry circuit 26 to be supplied to the shutter control circuit 316.

According to this embodiment, the non-flash photometry is selected in the following two cases:
(iii) when the output from the comparator 309 is "H"
(iv) when the output from the comparator 309 is "L", the output from the comparator 321 is "H", and the output from the comparator 324 is "L".

That is, the case (iii) expresses a state that camera shake is within a region in which the camera shake can be compensated by the device to prevent image blurs, while the case (iv) expresses a state that intensity of camera shake exceeds the region in which the camera shake can be compensated by the device to prevent image blurs, the distance from the subject is substantially infinite, and flash light cannot reach the subject.

When the flash photography mode is selected, the flash charging switch device 315 causes the flashgun 28 to be subjected to the charging. When the charge of the flashgun 28 is completed, signal "H" is transmitted by the flash charging switch device 315 to the AND gate 317. When the switch SW-2 is switched on by the user's action to press the shutter release button to the second stroke, photography is conducted by the operation of the photography sequence control circuit 500.

Figure 8A:
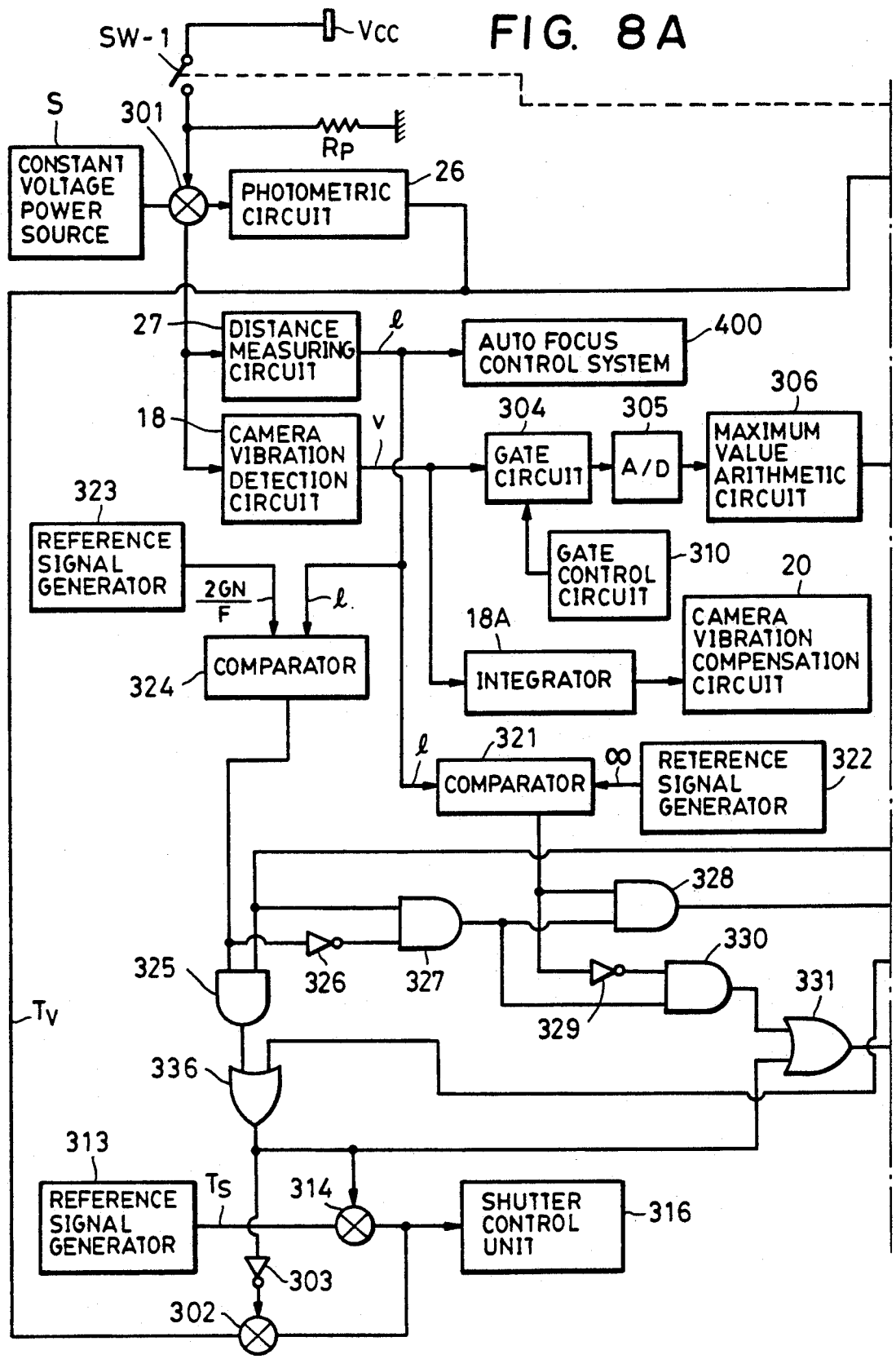
FIG. 8 includes FIGS. 8A and 8B, which are block diagrams illustrating the structure of the third embodiment of the exposure mode selection means according to the present invention and corresponding to the flow chart shown in FIG. 5.

FIGS. 8A and 8B illustrate the structure of the exposure mode determining means which corresponds to the flow chart shown in Table 3 and FIGS. 5A and 5B. Referring to the drawing, the elements given the same reference symbols and numerals are the same elements shown in FIGS. 7A and 7B. Therefore, the description about the elements are omitted.

Referring to FIG. 8B, the right half structure of FIG. 8 is different from the structure shown in FIG. 7B, the right half structure showing the elements capable of executing the processes in the flow chart shown in the right half portion shown in FIG. 5B. Referring to FIGS. 8A and 8B, symbol SW-3 represents a switch for the self-timer, the switch SW-3 switching on/off both two portions shown in FIGS. 8A and 8B. Furthermore, the switch SW-1 is arranged to be switched on/off in synchronization with the operation of the switch SW-3. Reference numeral 333 represents a comparator, 334 represents a reference signal generator capable of transmitting shutter speed (time in which the shutter is opened) $T_B$ with which the subject shake can be caused to occur. Reference numeral 342 represents a self-timer start circuit, 335, 338 represent AND gates, and 336, 341, and 345 represent OR gates.

Then, the operation of the structure shown in FIGS. 8A and 8B will be described.

At an action of photography using a self-timer, when the user of the camera presses the self-timer operation button (omitted from illustration), the switch SW-3 is switched on, causing the switch SW-1 being simultaneously switched on. As a result, power source S is, similarly to the above-description, connected to the photometry circuit 26, the range finding circuit 27, and the camera shake detection means 18 via the analog switch 301. As a result, the photometry circuit 26, the range finding circuit 27, and the camera shake detection means 18 are actuated so that the photometry, the range finding, and the camera shake detection are conducted similarly to the above-described embodiment. Then, shutter speed $T_V$ which corresponds to the results of the photometry conducted by the photometry circuit 26 is transmitted to the comparators 309, 333, and the analog switch 302. The shutter speed $T_V$ which has been thus supplied to the comparator 333 is then subjected to a comparison made with shutter speed $T_B$ which is the output from the reference signal generator 334. If $T_V \leq T_B$, the output from the comparator 333 becomes "H". Since the ensuing operation becomes different on the basis of the fact that the output from the comparator 309 is "H" or "L", the description will be made in the cases classified on the basis of the output from the comparator 309 and the same from the comparator 333.

(a) when the output from the comparator 309 is "H" ($T_V \leq T_A$) and the output from the comparator 333 is "H" ($T_V \leq T_B$)

The output from the AND gate 335 becomes "H" and the output from the OR gate becomes "H", causing an input signal to be supplied to the self-timer starting circuit 342. As a result, the self-timer starts counting. On the other hand, since the output from the AND gate 338 is "L", the flash charging switch device 315 is not operated so that the outdoor daylight photography mode is selected. In this case, the shutter speed is determined to be shutter open time $T_V$ which is the value in accordance with the result of the photometry.

(b) When the output from the comparator 309 is "H" and the output from the comparator 333 is "L"

The output from the AND gate 335 becomes "L", and the output from the AND gate 338 becomes "H" so as to make the analog switch 314 act to cause reference signal $T_S$ to be supplied to the shutter control circuit 316 via the OR gate 336. Furthermore, a signal is supplied to the flash charging switch device 315 via the OR gate 345 so that the charging of the flashgun 28 is conducted. When the charging of the flashgun is completed and an output is transmitted from the flash switch device 315, The output from the OR gate 341 becomes "H", causing the self-timer starting circuit 342 to be started. When the self-timer has completed its predetermined counting action, the output from the OR gate 320 becomes "H" by the output from the self-timer starting circuit 342. As a result, the photography sequence control circuit 500 is operated. That is, the flash photography with a specified shutter open time $T_S$ using a self-timer is selected.

(c) When the output from the comparator 309 is "L" and the output from the comparator 333 is "H"

The output from the AND gate 338 becomes "H", the output from the AND gate 335 becomes "L", and the output from the NOT gate 312 becomes "H". As a result, when the photography mode such as flash photography or outdoor daylight photography is determined in accordance with the subject distance by the same operation as that of the case in which the camera shake cannot be compensated by the device to prevent image blurs shown in FIGS. 7A and 7B, a signal representing the determination is supplied to the self-timer start circuit 342 from the AND gate 328 via the OR gate 341 or supplied from the OR gate 331 via the OR gate 345, the flash charging switch device 315, and the OR gate 341. Then, the self-timer start circuit 342 starts counting a predetermining self-timer time. When a predetermined self-timer time has been counted by the self-timer start circuit 342, a signal is transmitted therefrom to the control means 500 via the OR gate 320 so that flash photography under a predetermined exposure conditions is conducted.

(d) When both output from the comparator 309 and the same from the comparator 33 are "L"

In this case, the same result as (c) is obtained.

What is claimed is:

1. A camera comprising:
   (A) means capable of preventing image blurs; and
   (B) instruction means capable of specifying a predetermined exposure mode if said means capable of preventing image blurs cannot compensate the image blurs.

2. A camera according to claim 1, wherein said instruction means includes means capable of specifying a flash photography mode as said predetermined exposure mode.

3. A camera according to claim 2, wherein said flash photography mode specifying means includes means capable of specifying a specific shutter speed for flash photography as said predetermined exposure mode.

4. A camera according to claim 2, wherein said flash photography mode specifying means includes means capable of specifying a specific short shutter speed in order to prevent image blurs as said predetermined exposure mode.

5. A camera according to claim 1, wherein said instruction means includes means capable of specifying a specific shutter speed as said predetermined exposure mode.

6. A camera according to claim 1, wherein said instruction means includes means capable of specifying a specific short shutter speed in order to prevent image blurs as said predetermined exposure mode.

7. A camera according to claim 1, wherein said instruction means includes means capable of specifying a flash photography mode with a specific shutter speed as said predetermined exposure mode.

8. A camera according to claim 1, wherein said instruction means includes means capable of specifying a flash photography mode with a shutter speed determined in accordance with a result of photometry as said predetermined exposure mode.

9. A camera according to claim 1, wherein said instruction means includes means capable of specifying an outdoor daylight photography mode with a shutter speed determined in accordance with a result of photometry and in which no flash light is emitted as said predetermined exposure mode.

10. A camera according to claim 7, wherein said instruction means includes determining means capable of specifying said flash photography mode with said specific shutter speed in accordance with a subject distance.

11. A camera according to claim 10, wherein said determining means includes means capable of specifying said flash photography mode with said specific shutter speed when said subject distance is within a range to which flash light can effectively reach.

12. A camera according to claim 8, wherein said instruction means includes determining means capable of specifying said flash photography mode with said shutter speed determined in accordance with a result of photometry in accordance with a subject distance.

13. A camera according to claim 12, wherein said determining means includes means capable of specifying said flash photography mode with said shutter speed determined in accordance with a result of said photometry when said subject distance is not within a range to which flash light can effectively reach and also when the same is not an infinite distance.

14. A camera according to claim 9, wherein said instruction means includes determining means capable of specifying an outdoor daylight photography mode with a shutter speed determined in accordance with a result of said photometry and in which no flash light is emitted in accordance with a subject distance.

15. A camera according to claim 14, wherein said determining means includes means capable of specifying an outdoor daylight photography mode with a shutter speed determined in accordance with a result of said photometry and in which no flash light is emitted when said subject distance is an infinite distance.

16. A camera according to claim 1, wherein said instruction means includes determining means capable of specifying an exposure mode in accordance with a subject distance.

17. A camera according to claim 1 further comprising second instruction means capable of specifying an outdoor daylight photography mode with a shutter speed determined in accordance with a result of photometry and in which no flash light is emitted when said device to prevent image blurs can compensate the image blur prevention.

18. A camera according to claim 1 further comprising second instruction means capable of specifying a predetermined exposure mode in a self-timer photography mode even if said device to prevent image blurs can compensate the image blur prevention.

19. A camera according to claim 18, wherein said second instruction means includes means capable of specifying a flash photography mode as said predetermined exposure mode when an intensity of outdoor light is insufficient for proper exposure.

20. A camera according to claim 19, wherein said flash photography mode specifying means includes means capable of specifying a specific shutter speed for flash photography as said predetermined exposure mode.

21. A camera according to claim 19, wherein said flash photography mode specifying means includes means capable of specifying a specific short shutter speed in order to prevent image blurs as said predetermined exposure mode.

22. A camera according to claim 18, wherein said second instruction means includes means capable of specifying a specific shutter speed as said predetermined exposure mode when intensity of outdoor light is insufficient for proper exposure.

23. A camera according to claim 18, wherein said second instruction means includes means capable of specifying a specific short shutter speed as said predetermined exposure mode in order to prevent image blurs when intensity of outdoor light is insufficient for proper exposure.

24. A camera according to claim 18, wherein said second instruction means includes means capable of specifying said predetermined exposure mode in accordance with a result of photometry.

25. A camera according to claim 18, wherein said second instruction means includes means capable of specifying an outdoor daylight photography mode with a shutter speed determined in accordance with a result of photometry and in which no flash light is emitted when intensity of outdoor light is sufficient as said predetermined exposure mode.

26. An image stabilizing device or a camera having said image stabilizing device comprising:
   (a) image stabilizing means for preventing image blurs; and
   (b) control means for causing said camera to perform different operations in response to a state of said image stabilizing means.

27. A device or a camera according to claim 26, wherein said control means comprises determination means for determining whether said image stabilizing means can prevent image blurs.

28. A device or a camera according to claim 27, wherein said control means comprises indication means for indicating a predetermined photography mode in response to said determination means determining that said image stabilizing means cannot prevent image blurs.

29. A device or a camera according to claim 28, wherein said indication means comprises means for specifying a flash photography mode as said predetermined photography mode.

30. A device or a camera according to claim 29, wherein said flash photography mode specifying means comprises means for specifying a specific shutter speed for flash photography as said predetermined photography mode.

31. A device or a camera according to claim 29, wherein said flash photography mode specifying means comprises means for specifying a specific fast shutter speed to prevent image blurs as said predetermined photography mode.

32. A device or a camera according to claim 28, wherein said indication means comprises means for specifying a specific shutter speed as said predetermined photography mode.

33. A device or a camera according to claim 28, wherein said indication means comprises means for specifying a specific fast shutter speed to prevent image blurs as said predetermined photography mode.

34. A device or a camera according to claim 28, wherein said indication means comprises means for specifying a flash photography mode with a specific shutter speed as said predetermined photography mode.

35. A device or a camera according to claim 34, wherein said determining means comprises means for specifying said flash photography mode with said specific shutter speed in accordance with a subject distance.

36. A device or a camera according to claim 35, wherein said determining means comprises means for specifying said flash photography mode with the specific shutter speed when said subject distance is within a range to which flash light can effectively reach.

37. A device or camera according to claim 28, wherein said indication means comprises means for specifying a flash photography mode with a shutter speed determined in accordance with a result of photometry as said predetermined photography mode.

38. A device or a camera according to claim 37, wherein said indication means comprises means for specifying said flash photography mode with said shutter speed determined in accordance with a result of photometry, and in accordance with a subject distance.

39. A device or a camera according to claim 38, wherein said determining means comprises means for specifying said flash photography mode with said shutter speed determined in accordance with a result of said photometry when said subject distance is not within a range to which flash light can effectively reach and also when the same is not an infinite distance.

40. A device or a camera according to claim 28, wherein said indication means comprises means for specifying a photography mode with a shutter speed determined in accordance with a result of photometry and in which no flash light is emitted as said predetermined photography mode.

41. A device or a camera according to claim 40, wherein said indication means comprises determining means for specifying a photography mode with a shutter speed determined in accordance with a result of said photometry and in which no flash light is emitted in accordance with a subject distance.

42. A device or a camera according to claim 41, wherein said determining means comprises means for specifying a photography mode with a shutter speed determined in accordance with a result of said photometry and in which no flash light is emitted when said subject distance is an infinite distance.

43. A device or a camera according to claim 28, wherein said indication means includes determining means for specifying a photography mode in accordance with a subject distance.

44. A device or a camera according to claim 28, wherein said control means comprises second indication means for specifying a photography mode with a shutter speed determined in accordance with a result of photometry and in which no flash light is emitted in response to said determination means determining that said image stabilizing means operating properly.

45. A device or a camera according to claim 28, further comprising second indications means for specifying a predetermined photography mode in a self-timer photography mode even if said image stabilizing means can prevent image blurs.

46. A device or a camera according to claim 45, wherein said second indication means comprises means for specifying a specific shutter speed as said predetermined photography mode when the brightness of an object is insufficient for proper exposure.

47. A device or a camera according to claim 45, wherein said second indication means comprises means for specifying a specific short shutter speed as the predetermined photography mode to prevent image blurs when the brightness of an object is insufficient for proper exposure.

48. A device or a camera according to claim 45, wherein said second indication means comprises means for specifying said predetermined photography mode in accordance with a result of photometry.

49. A device or a camera according to claim 45, wherein said second indication means comprises means for specifying a photography mode with a shutter speed determined in accordance with a result of photometry and in which no flash light is emitted when the brightness of an object is sufficient for proper exposure as said predetermined photography mode.

50. A device or a camera according to claim 49, wherein said second indication means comprises means for specifying a flash photography mode as said predetermined photography mode when the brightness of an object is insufficient for proper exposure.

51. A device or a camera according to claim 50, wherein said flash photography mode specifying means comprises means for specifying a specific shutter speed for flash photography as said predetermined photography mode.

52. A device or a camera according to claim 50, wherein said flash photography mode specifying means comprises means for specifying a specific fast shutter speed to prevent image blurs as said predetermined photography mode.

53. A device or a camera according to claim 27, wherein said control means comprises indication means for indicating a predetermined photography mode in response to said determination means determining the said image stabilizing means is operating properly.

54. A device or a camera according to claim 53, wherein said predetermined photography mode comprises a photography mode in accordance with a result of photometry.

55. A device or a camera according to claim 53, wherein said predetermined photography mode comprises a photography mode with a shutter speed determined in accordance with a result of photometry.

56. A device or a camera according to claim 27, wherein said control means comprises indication means for indicating a predetermined photography mode in response to said determination means and a self-timer mode.

57. A device or a camera according to claim 56, wherein said indication means comprises means for specifying a flash photography mode as said predetermined photography mode.

58. A device or a camera according to claim 57, wherein said flash photography mode specifying means comprises means for specifying a specific shutter speed for flash photography as said predetermined photography mode.

59. A device or a camera according to claim 57, wherein said flash photography mode specifying means comprises means for specifying a specific fast shutter speed to prevent image blurs as said predetermined photography mode.

60. A device or a camera according to claim 56, wherein said indication means comprises means for specifying a specific shutter speed as said predetermined photography mode.

61. A device or a camera according to claim 56, wherein said indication means comprises means for specifying a specific fast shutter speed to prevent image blurs as said predetermined photography mode.

* * * * *

UNITED STATES PATENT AND TRADEMARK OFFICE
CERTIFICATE OF CORRECTION

PATENT NO. : 5,084,724  
DATED : January 28, 1992  
INVENTOR(S) : HIROSHI MAENO

It is certified that error appears in the above-identified patent and that said Letters Patent is hereby corrected as shown below:

[57] ABSTRACT:
    Line 5, "compensate" should read --compensate for--.

SHEET 5:
    Fig. 5B, "MEASERE" should read --MEASURE--.

SHEET 10:
    Fig. 8A, "RETERENCE" should read --REFERENCE--.

COLUMN 5:
    Line 34, "neglected." should read --disregarded.--; and
    Line 56, "(X-axis," should read --X-axis,--.

COLUMN 6:
    Line 7, "came" should read --camera--.

COLUMN 7:
    Line 22, "with" should read --with the--;
    Line 36, "around" should read --around the--; and
    Line 47, "neglected." should read --disregarded.--.

COLUMN 9:
    Line 20, "accelometer" should read --accelerometer--.

COLUMN 10:
    Line 7, "12," should read --12 and--; and
    Line 21, "5," should read --5 and--.

COLUMN 11:
    Line 35, "to have" should read --which has--.

UNITED STATES PATENT AND TRADEMARK OFFICE
CERTIFICATE OF CORRECTION

PATENT NO. : 5,084,724

DATED : January 28, 1992

INVENTOR(S) : HIROSHI MAENO

It is certified that error appears in the above-identified patent and that said Letters Patent is hereby corrected as shown below:

COLUMN 12:
    Line 18, "fame 3." should read --frame 3.--;
    Line 23, "positions" should read --position--;
    Line 28, "supportframe" should read --support frame--; and
    Line 50, "from" should read --by--.

COLUMN 13:
    Line 28, "on" should read --on the--; and
    Line 52, "neglected." should read --disregarded.--.

COLUMN 14:
    Table 1, "(compensatable" (both occurrences) should read --(compensable--;
    Table 2, "<Compensatable" (all occurrences) should read --<Compensable--; and
    Line 53, "the fact" should be deleted.

COLUMN 15:
    Line 15, "the fact" should be deleted;
    Line 21, "lacking" should read --lack of natural light--;
    Line 25, "causes" should read --cause--; and
    Line 58, "a" (first occurrence) should be deleted.

UNITED STATES PATENT AND TRADEMARK OFFICE
CERTIFICATE OF CORRECTION

PATENT NO. : 5,084,724

DATED : January 28, 1992

INVENTOR(S) : HIROSHI MAENO

It is certified that error appears in the above-identified patent and that said Letters Patent is hereby corrected as shown below:

COLUMN 16:
    Line 12, "user" should read --the user--;
    Table 3, "(compensatable" should read
        --(compensable--;
    Table 3, "<Compensatable" (both occurrences) should
        read --<Compensable--;
    Table 3, "Flash photography (AE)" should read
        --Flash photography (FA)--; and
    Line 52, "the fact" should be deleted.

COLUMN 17:
    Line 28, "longeset," should read --longest,--;
    Line 53, "SW-1" should read --SW-1:--;
    Line 55, "SW-2" should read --SW-2:--; and
    Line 58, "SW-3" should read --SW-3:--.

COLUMN 18:
    Line 30, "the" (second occurrence) should be deleted; and
    Line 43, "a fact" should be deleted.

COLUMN 19:
    Line 5, "a fact" should be deleted; and
    Line 43, "the fact" should be deleted.

COLUMN 20:
    Line 14, "a fact" should be deleted;
    Line 29, "out" should read --out of--;
    Line 30, "no" should be deleted;
    Line 59, "Fig. 6A)." should read --Fig. 6A is
        provided).--; and
    Line 60, "auto focus" should read --autofocus--.

UNITED STATES PATENT AND TRADEMARK OFFICE
CERTIFICATE OF CORRECTION

PATENT NO. : 5,084,724
DATED : January 28, 1992
INVENTOR(S) : HIROSHI MAENO

It is certified that error appears in the above-identified patent and that said Letters Patent is hereby corrected as shown below:

COLUMN 21:
    Line 63, "auto focusing" should read --autofocusing--.

COLUMN 22:
    Line 14, "391" should read --319--;
    Line 42, "blurs" should read --blur--; and
    Line 49, "the" should read --when the--.

COLUMN 25:
    Line 2, "about" should read --of--;
    Line 2, "are" should read --is--; and
    Line 13, "334" should read --and 334--.

COLUMN 26:
    Line 35, "comparator 33" should read --comparator 333--; and
    Line 42, "compensate" should read --compensate for--.

COLUMN 27:
    Line 55, "compensate" should read --compensate for--; and
    Line 61, "compensate" should read --compensate for--.

UNITED STATES PATENT AND TRADEMARK OFFICE
CERTIFICATE OF CORRECTION

PATENT NO. : 5,084,724
DATED : January 28, 1992
INVENTOR(S) : HIROSHI MAENO

It is certified that error appears in the above-identified patent and that said Letters Patent is hereby corrected as shown below:

COLUMN 29:
  Line 63, "means" should read --means is--; and
  Line 65, "indications" should read --indication--.

Signed and Sealed this

Twenty-sixth Day of October, 1993

Attest:

BRUCE LEHMAN

Attesting Officer   Commissioner of Patents and Trademarks